(12) United States Patent
Damjanovic et al.

(10) Patent No.: US 9,667,163 B1
(45) Date of Patent: May 30, 2017

(54) FIVE PHASE POWER DISTRIBUTION SYSTEM

(71) Applicants: Aleksandar B. Damjanovic, Oldsmar, FL (US); Nenad P. Damjanovic, Oldsmar, FL (US)

(72) Inventors: Aleksandar B. Damjanovic, Oldsmar, FL (US); Nenad P. Damjanovic, Oldsmar, FL (US)

( * ) Notice: Subject to any disclaimer, the term of this patent is extended or adjusted under 35 U.S.C. 154(b) by 388 days.

(21) Appl. No.: 14/606,551

(22) Filed: Jan. 27, 2015

(51) Int. Cl.
*H02J 3/00* (2006.01)
*H02M 5/14* (2006.01)
*H02J 3/01* (2006.01)

(52) U.S. Cl.
CPC ............... *H02M 5/14* (2013.01); *H02J 3/01* (2013.01)

(58) Field of Classification Search
CPC ............... H02M 5/00; H02M 5/14; H02J 3/01
USPC .......................................................... 307/17
See application file for complete search history.

(56) References Cited

U.S. PATENT DOCUMENTS

2008/0252267 A1* 10/2008 Lando ..................... F01D 15/10
322/90

* cited by examiner

*Primary Examiner* — Carlos Amaya
(74) *Attorney, Agent, or Firm* — Larson & Larson, P.A.; Frank Liebenow

(57) ABSTRACT

A system for providing increased energy efficiency and harmonic reduction has a source of three phase AC electrical potential, a three phase to five phase power transformer converter coupled to the source of three phase AC electrical potential, a five phase cable coupled to the three phase to five phase power transformer converter, and at least one load coupled to the five phase cable.

26 Claims, 23 Drawing Sheets

1

FIVE PHASE POWER DISTRIBUTION SYSTEM

BACKGROUND OF THE INVENTION

Field of the Invention

The present invention relates to a five phase power distribution system and, more particularly to a five phase power distribution system to provide increased energy efficient and harmonic reduction.

Description of the Prior Art

Three phase electrical power systems are commonly used in generation, transmission, and distribution of electric power. A three-phase system is a generator-load pair in which the generator produces three sinusoidal voltages of equal amplitude and frequency but differing in phase by 120 degrees. It is a type of polyphase system which is the most common used by electric power distribution grids worldwide. The three-phase system was introduced and patented by Nikola Tesla in the years from 1887 to 1888.

In a three-phase system, three circuit conductors carry three alternating currents, of the same frequency, which reach their instantaneous peak values at different times.

Traditional electrical system design had very little to do with harmonics because the loads typically designed were linear in nature. Because a substantial portion of the today loads are nonlinear in nature, producing harmonics, in today electrical system design they should be taken into consideration.

Harmonic currents come from electronic equipment such as: adjustable-speed motor drives, fluorescent lighting, personal computers and home electronics. Harmonic currents result in additional heat losses, reduce efficiency and operation of the devices, and reduce power factor. Overheating of electrical cables and wiring has been most prominent in commercial buildings with a high usage of electronic-type equipment. Increased current that contains more harmonics leads to higher distribution network and wiring losses per watt of connected load.

Predominant harmonics are: 3rd, 5th and 7th. These harmonic are known to cause problems for users as well as for maintenance and operation. No cost effective and ultimate method have been proposed that can universally deal with 3rd, 5th and 7th harmonics during the design and specification stage of three phase electrical distribution systems.

Over the years, several approaches evolved and became widely used to improve operations of three phase systems, address the harmonics issues and mitigation techniques:

1. Multiphase, especially a 6-pulse and 12-pulse system is producing less ripple with a higher frequency of ripple in an ac/dc rectifier system. The reason of choice for a 6 phase, 12 phase, or 24 phase system is that these numbers are multiples of three and designing this type of system is simple and straightforward. However, increasing the number of phases certainly enhances the complexity of the system. None of these designs are available for an odd number of phases.

2. The PWM technique and special transformer connections are used to convert three phase systems to five-phase systems, and in the late 1970s were used for adjustable speed drive applications. Since then, a considerable research effort has been conducted to develop commercially feasible multiphase drive systems. The reliability of such systems is diminished due to the use of power electronics. The quality of the converted voltages can be questionable and the amount of transferred power can be limited.

3. Phase-shifting transformers of different configurations, used for decades in industrial and computer facilities, typically treat harmonics produced by loads that are balanced and connected phase to phase e.g. 5th, 7th, 11th, $13^{th}$ harmonics. By integrating phase shifting of multiple outputs, substantial reduction of 3rd, 5th and 7th harmonics can be achieved. The systems works in case of balanced load. Since the load is mostly unbalanced the full benefits of such are tremendously reduced. It requires several transformers to create such system.

4. Three phase zero sequence filters, zig-zag reactors, etc., have been used in commercial and institutional settings to reduce triplen harmonics, 3, 9, 15, . . . , and associated problems, high neutral current, voltage distortion, etc.

5. For harmonic mitigations and reactive compensations in industry, power transmission and distribution systems, utilities are widely used LC harmonic filers. The techniques are not that much suitable for commercial buildings and data centers, where the loads are mostly nonlinear with very high power factor close to unity. So it is not practical to use capacitors since there is no inductive power. LC harmonic filters are prone to easy overloading. They can create multiple resonant points which can interact with dynamic systems operation.

6. Six-phase transmission systems were initiated due to the rising cost of right of way for transmission corridors, environmental issues, and various stringent licensing laws. Six phase transmission lines can provide the same power capacity with a lower phase-to-phase voltage and smaller, more compact towers compared to a standard double-circuit three-phase line. The geometry of the six-phase compact towers may also aid in the reduction of magnetic fields as well. The disadvantage of the six phase system is that there is no inherent mitigation of harmonics, so additional action identical to three phase system need to be taken in order to mitigate harmonics.

The use of power handling systems is known in the prior art. More specifically, power handling systems previously devised and utilized for the purpose of generating, transmitting, and distributing electrical power are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe a five phase power distribution system with increased energy efficient and harmonic reduction.

In this respect, the five phase power distribution system according to the present invention substantially departs from the conventional concepts and designs of the prior art, and in doing so provides a system primarily developed for the purpose of increasing energy efficiency and reducing harmonics.

Therefore, it can be appreciated that there exists a continuing need for a new and improved five phase power distribution system. In this regard, the present invention substantially fulfills this need.

SUMMARY OF THE INVENTION

In view of the disadvantages inherent in the known types of power distribution devices now present in the prior art, the present invention provides an improved five phase power distribution system. As such, the general purpose of the present invention, which will be described subsequently in greater detail, is to provide a new and improved five phase power distribution system and method which has all the advantages of the prior art and none of the disadvantages.

To attain this, the present invention essentially comprises a five phase power distribution system for providing increased energy efficiency and harmonic reduction, particularly $3^{rd}$ and $5^{th}$ harmonics. The increased energy efficiency and the harmonic reduction are done in a safe, convenient, and economical manner. First provided is a source of three phase AC electrical potential. A three phase to five phase power transformer converter is coupled to the source of three phase AC electrical system. At least one load is coupled to the five phase distribution network.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying Out the several purposes of the present invention. It is important, therefore, that the invention be regarded as including such equivalent constructions insofar as they do not depart from the spirit and scope of the present invention.

It is therefore an object of the present invention to provide a new and improved five phase power distribution system which has all of the advantages of the prior art power distribution systems and none of the disadvantages.

It is another object of the present invention to provide a new and improved five phase power distribution system which may be easily and efficiently manufactured and marketed.

It is further object of the present invention to provide a new and improved five phase power distribution system which is of durable and reliable constructions.

An even further object of the present invention is to provide a new and improved five phase power distribution system which is susceptible of a low cost of manufacture with regard to both materials and labor, and which accordingly is then susceptible of low prices of sale to the consuming public, thereby making such five phase power distribution system economically available to the buying public.

Lastly, it is an object of the present invention to provide a new and improved five phase power distribution system for providing increased energy efficiency and harmonic reduction, the increased energy efficiency and the harmonic reduction being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference characteristics refer to the same parts throughout the various Figures.

DESCRIPTION OF THE PREFERRED EMBODIMENT

With reference now to the drawings, and in particular to FIGS. 1 through 5 thereof, the preferred embodiment of the new and improved five phase power distribution system embodying the principles and concepts of the present invention will be described.

Figure 1:
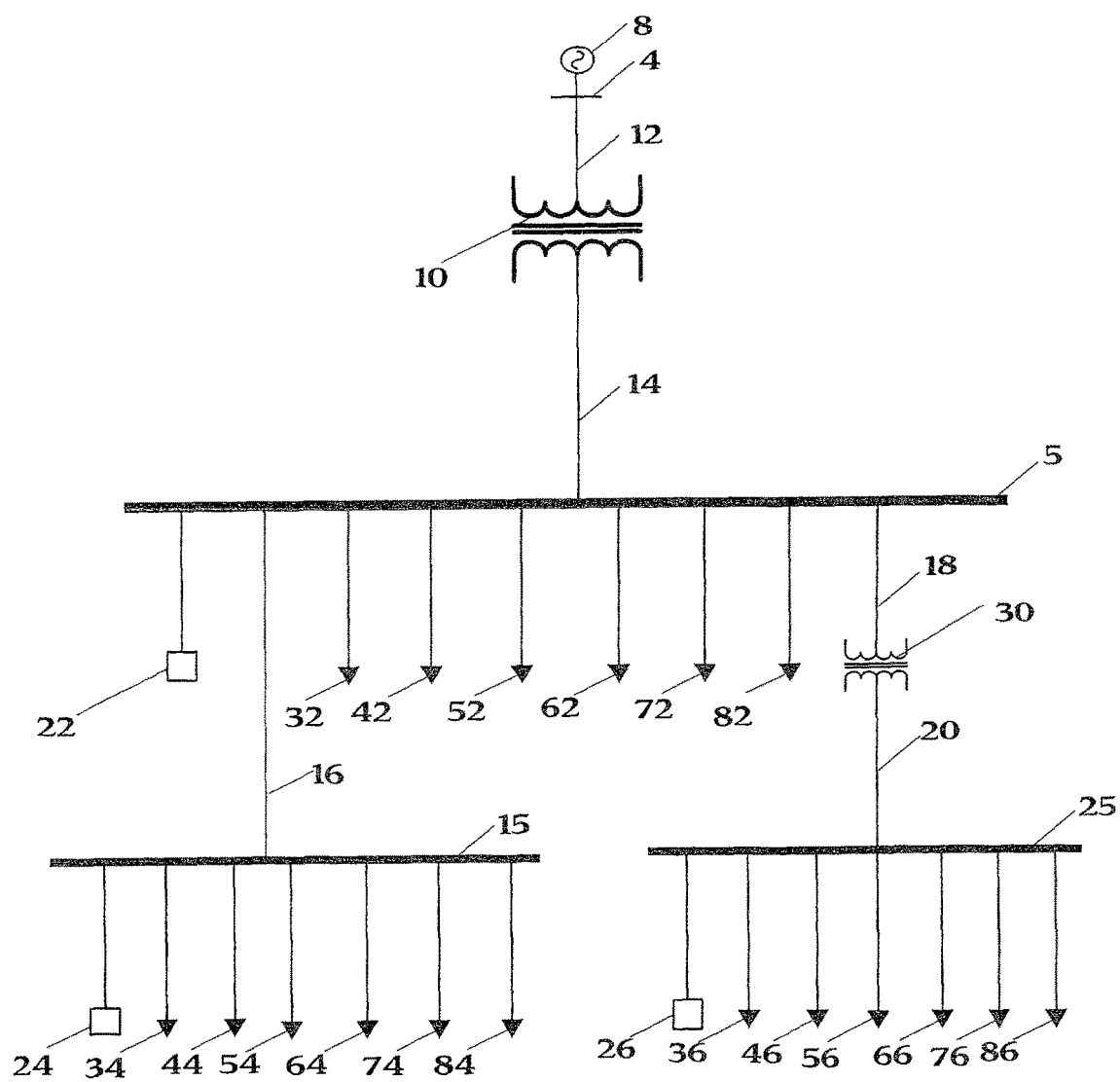
FIG. 1 is a schematic diagram of a five phase distribution power system constructed in accordance with the principles of the present invention.

The present invention, the five phase power distribution system is comprised of a plurality of components. The five phase system can have endless varieties of configurations. A typical configuration of five phase system is shown in FIG. 1. It has a primary three phase and secondary five phase power transformer converter 10, connected to a three phase power source 8, at the three phase bus-burs, panel or sub panel 4, via three phase distribution network 12 consisting of: power lines, and or cable, and or bus ducts, and or busway. The secondary side of the power distribution converter transformer 10 is connected to a main five phase bus system or distribution panel 5, via five phase distribution network 14 consisting of: power lines, and or cable, and or bus ducts, and or busway. A five to five phase power transformer 30, five phase nonlinear balanced or unbalanced load 72, two, three, or four phase nonlinear balanced or unbalanced loads 62, five phase linear balanced or unbalanced linear loads 52, two, three, or four phase balanced or unbalanced linear loads 42, single phase nonlinear loads, 82, single phase linear loads 32, five phase zero sequence fifth harmonic filter 22, and five phase distribution network 16 is direct connection to sub-distribution systems 15, consisting of: power lines, and or cable, and or bus ducts, and or busway, are connected to the main bus system or distribution panel 5.

A five phase nonlinear balanced or unbalanced load 74, two, three, or four phase nonlinear balanced or unbalanced loads 64, five phase linear balanced or unbalanced linear loads 54, two, three, or four phase balanced or unbalanced linear loads 44, single phase nonlinear loads, 84, single phase linear loads 34, five phase zero sequence fifth harmonic filter 24, are directly connected to sub-distribution systems 15.

Also from the main five phase supply bus system 5, a five phase step up or step down distribution transformer 30 supplies via five phase distribution network 18, 20 consisting of: power lines, and or cable, and or bus ducts, and or busway. a five phase distribution sub system or a system or a sub panel 25. Each sub distribution systems panel 25 have five phase nonlinear balanced or unbalanced load 76, two, three, or four phase nonlinear balanced or unbalanced loads 66, five phase linear balanced or unbalanced linear loads 56, two, three, or four phase balanced or unbalanced linear loads 46, single phase nonlinear loads, 86, single phase linear loads 36, five phase zero sequence fifth harmonic filter 26.

FIGS. 2 through 5, thereof, represents practical examples of the invention.

Figure 2:
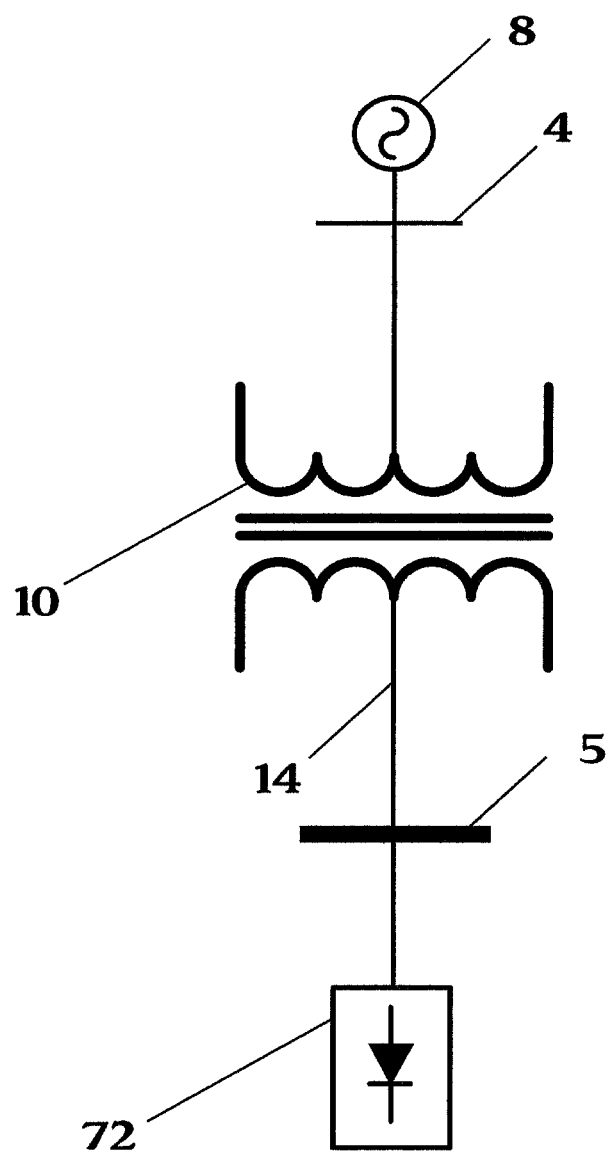
FIG. 2 and FIG. 2A through FIG. 2H are schematic diagrams and graphs of a five phase distribution power system with balanced nonlinear loads.

FIG. 2 shows a five phase distribution power system with balanced nonlinear load 72, connected on bus burs 5, via five phase cable 14, to three to five phase power distribution transformer converter 10. The three to five phase power distribution transformer converter 10, connected on the bus-burs 4 to the three phase AC systems 8.

Figure 2A:
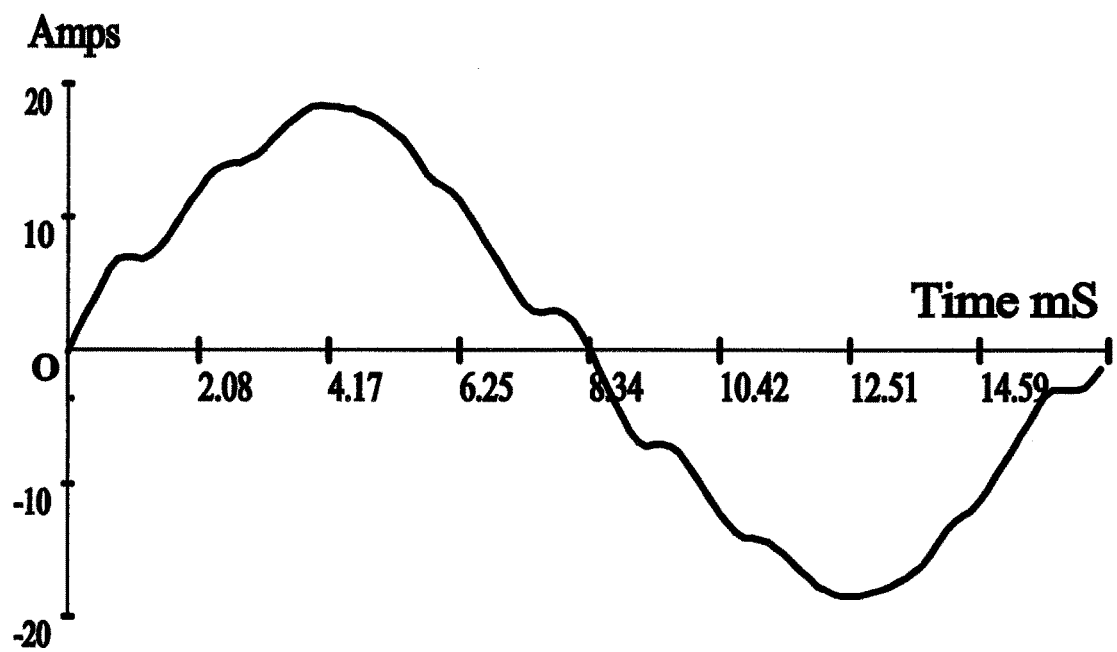
Figure 2B:
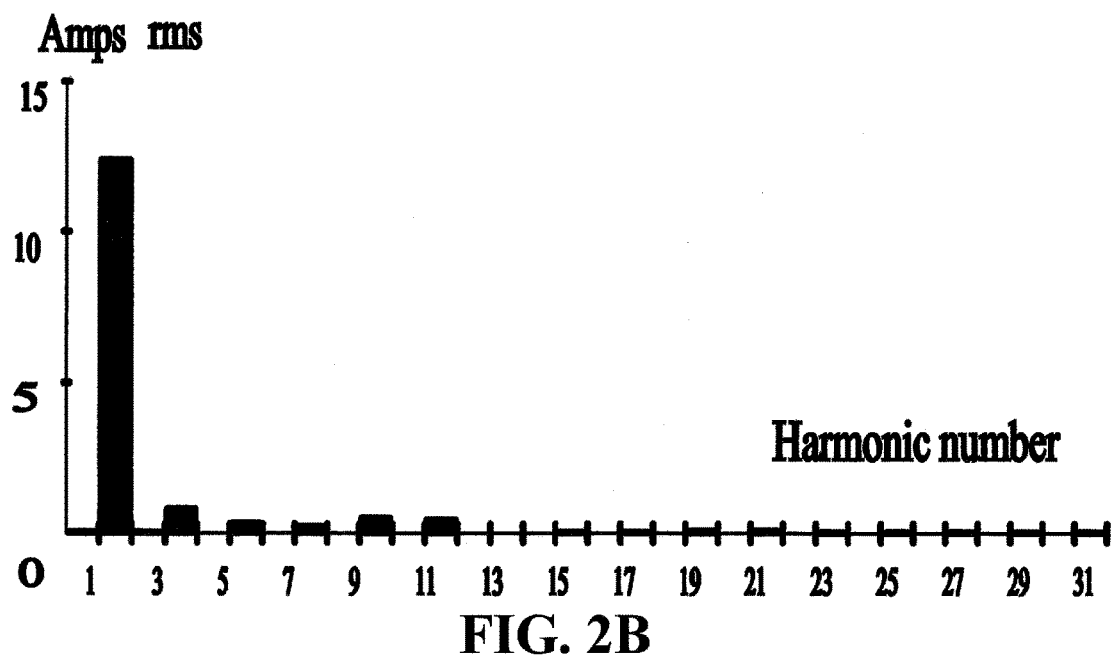

FIGS. 2A and 2B shows graph and harmonic chart of current on the three phase side, refereed in the Table 1.

Figure 2C:
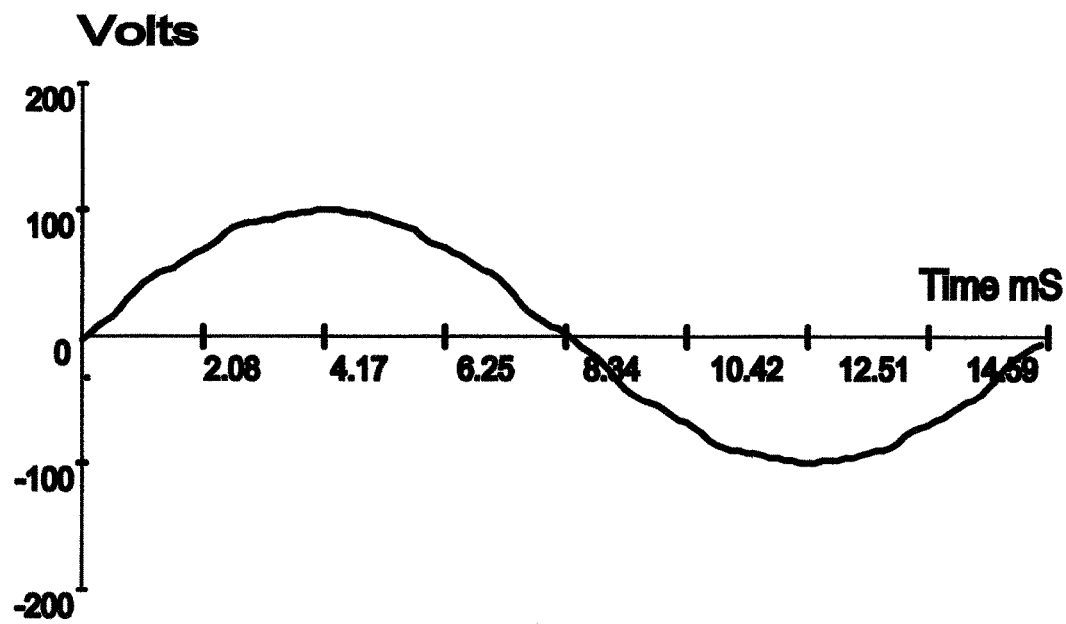
Figure 2D:
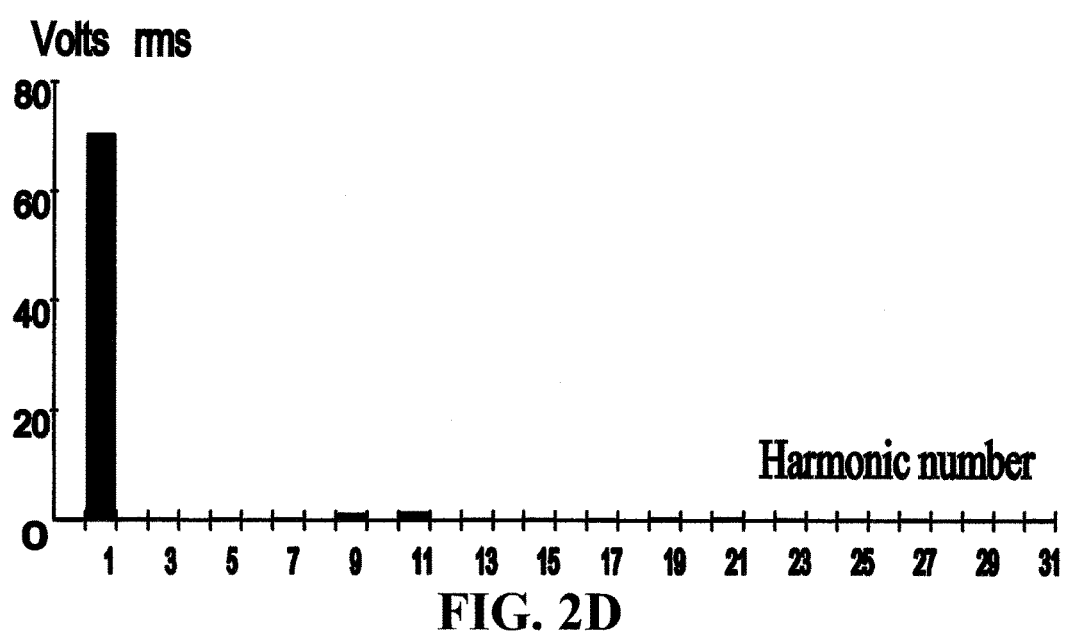

FIGS. 2C and 2D shows graph and harmonic chart of voltages on the three phase side, measured on the bus-burs 4, refereed in the Table 1.

Figure 2E:
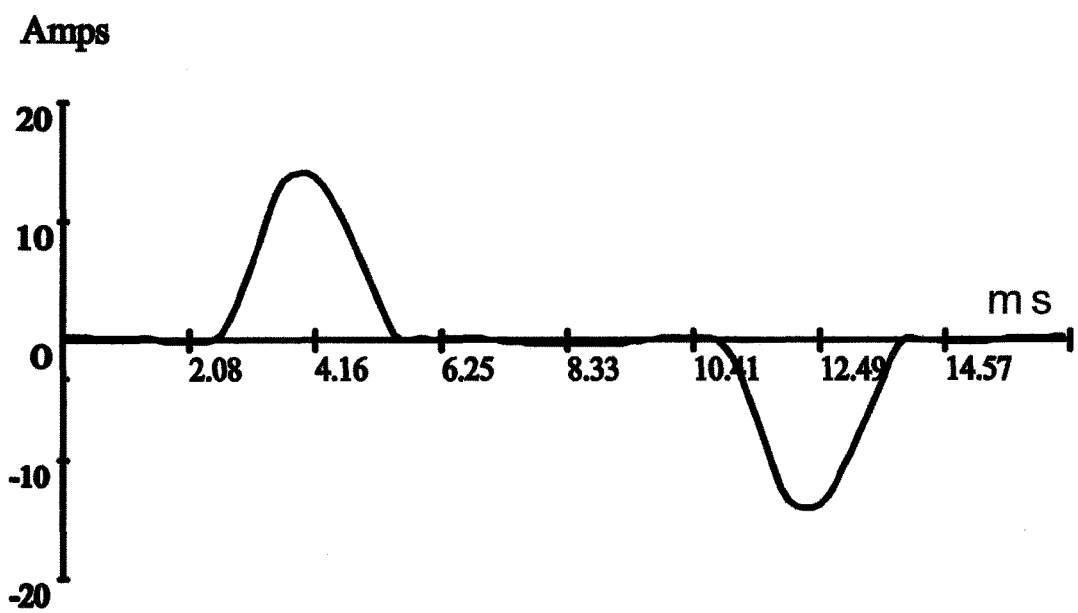
Figure 2F:
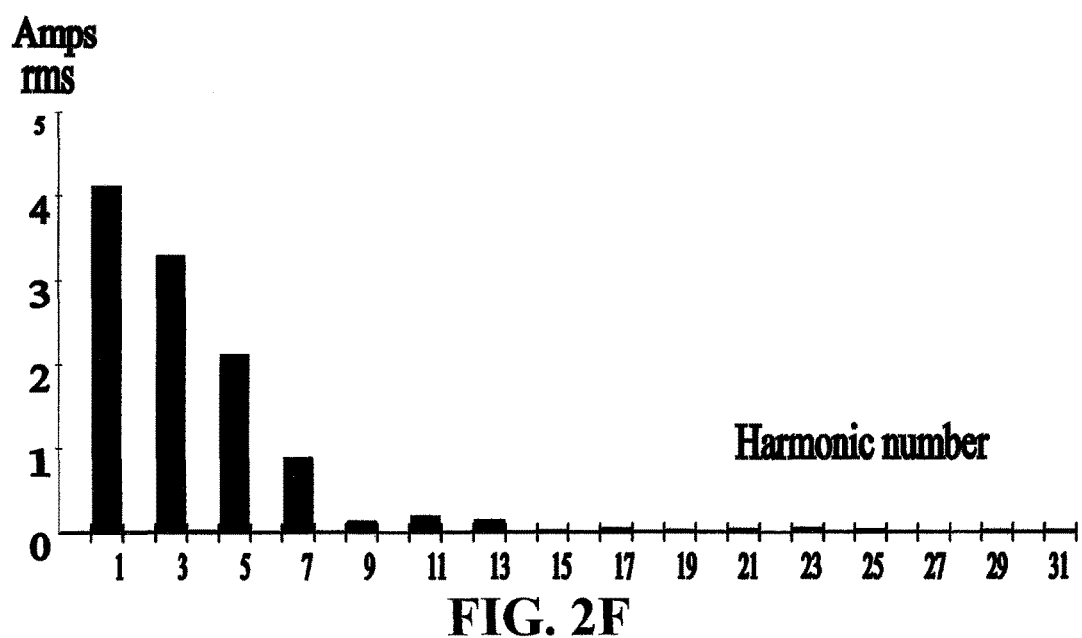

FIGS. 2E and 2F shows graph and harmonic chart of current on the five phase side, measured on the cable 14, refereed in the Table 2.

Figure 2G:
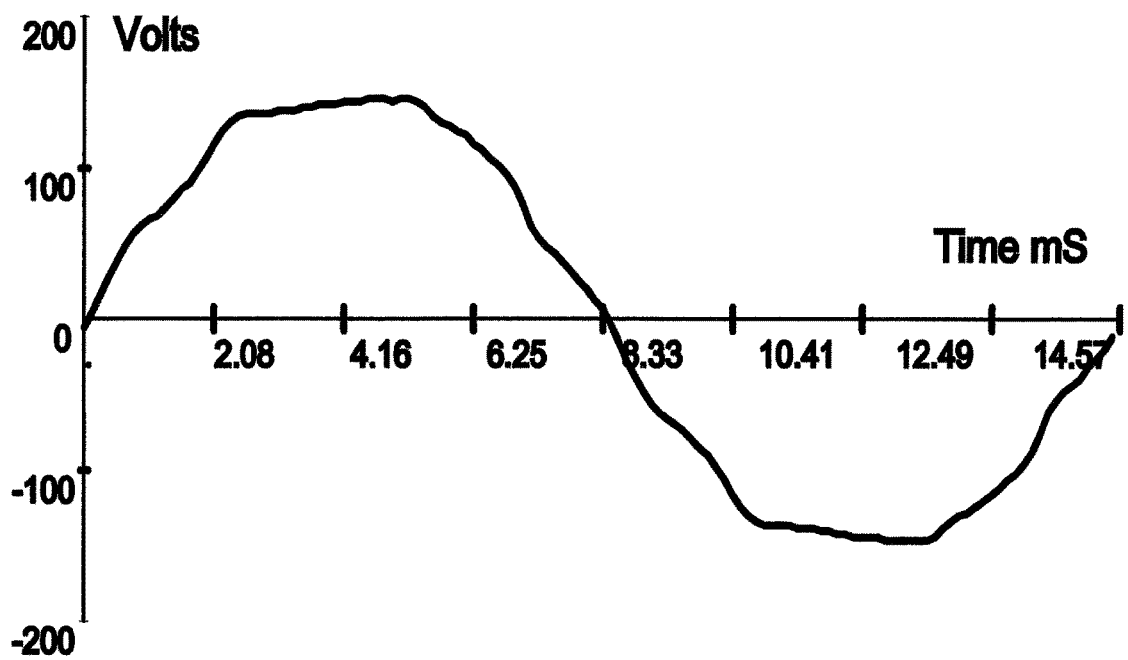
Figure 2H:
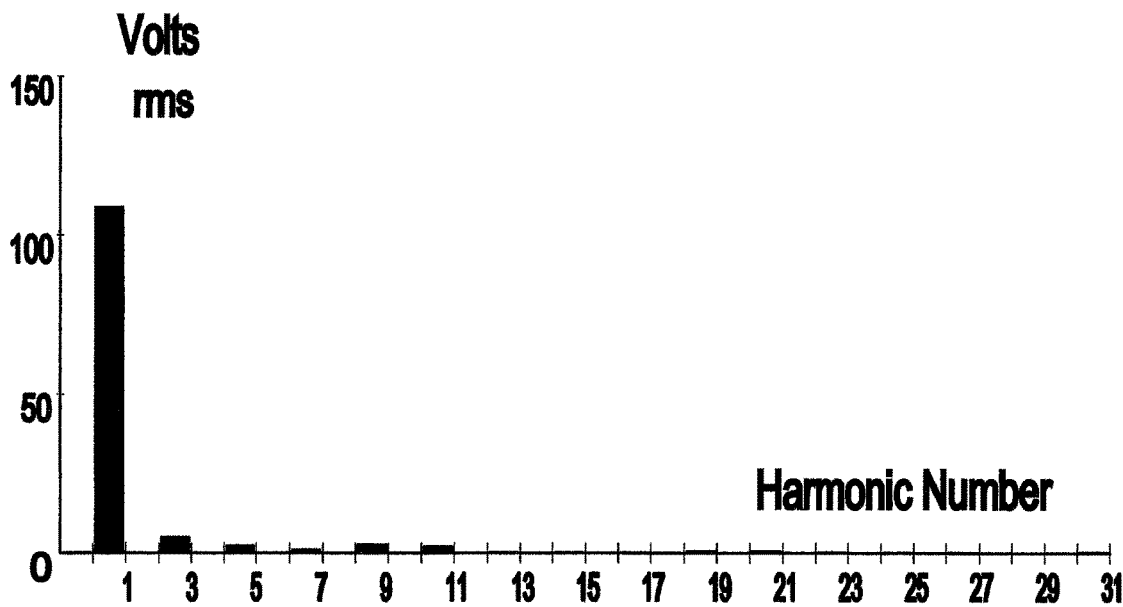
Figure 3:
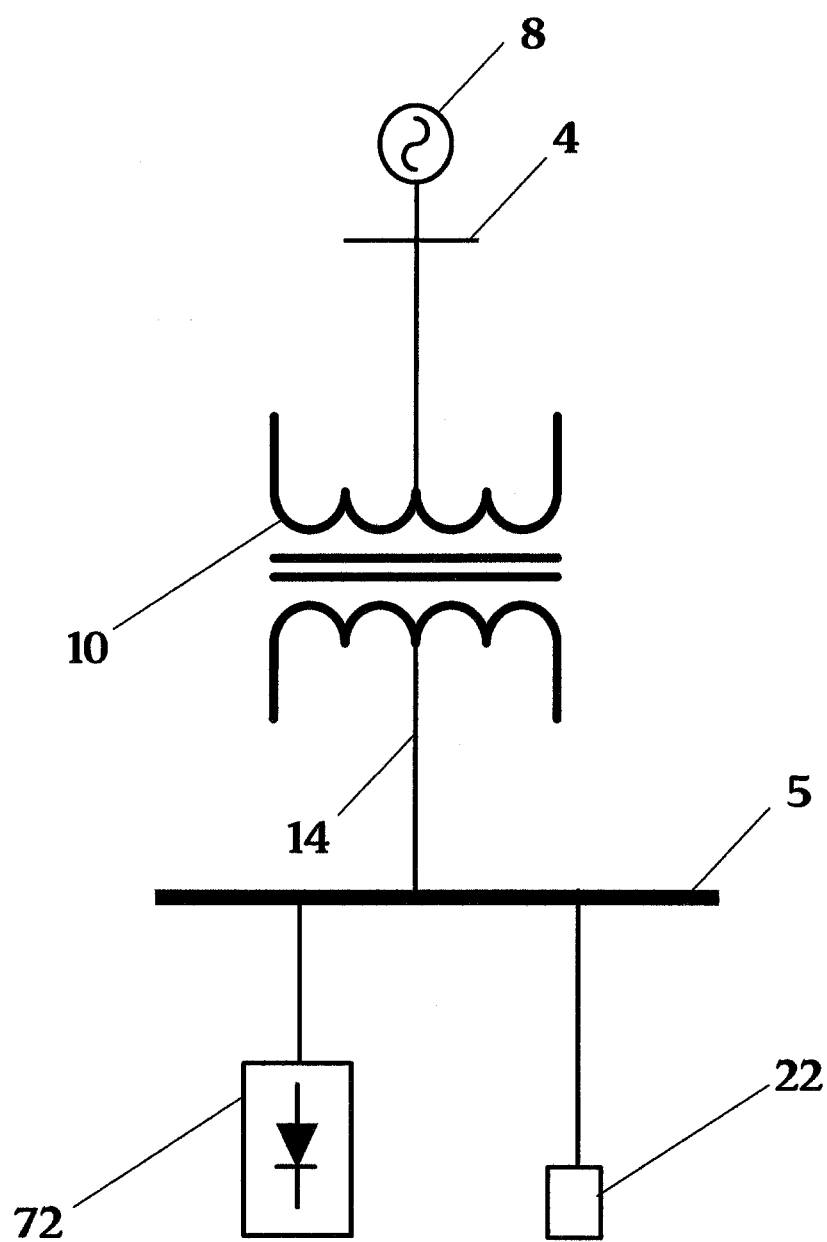
FIG. 3 and FIGS. 3A through 3J are schematic diagrams and graphs of a phase distribution power system with balanced nonlinear loads and $5^{th}$ harmonic, five phase zero sequence harmonic filter.
Figure 3A:
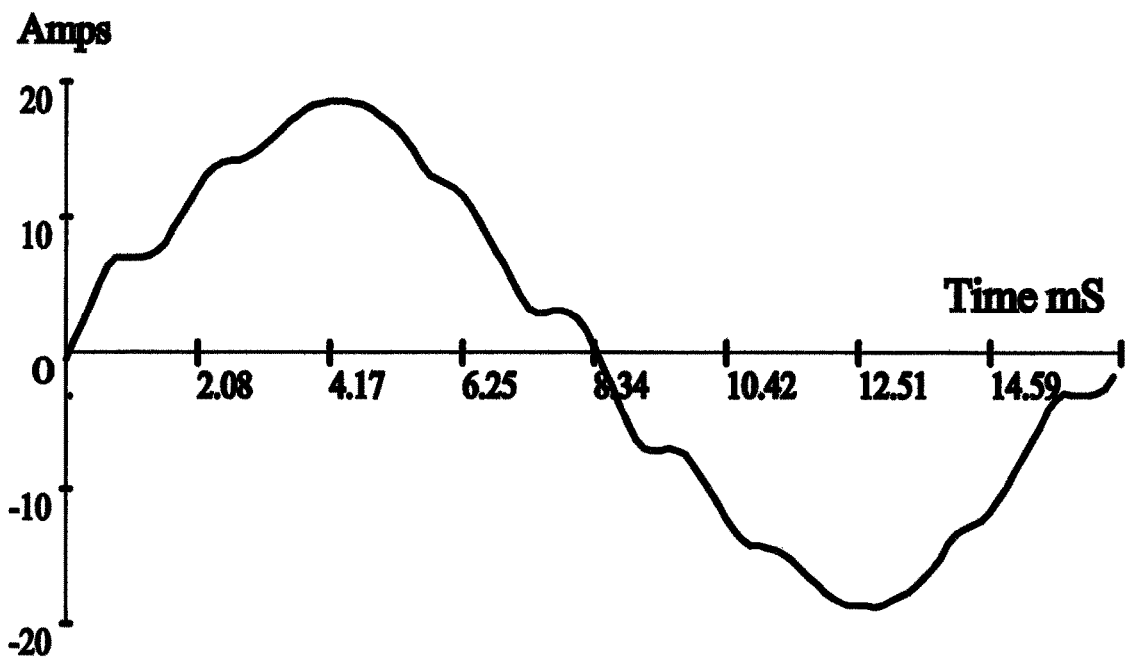
Figure 3B:
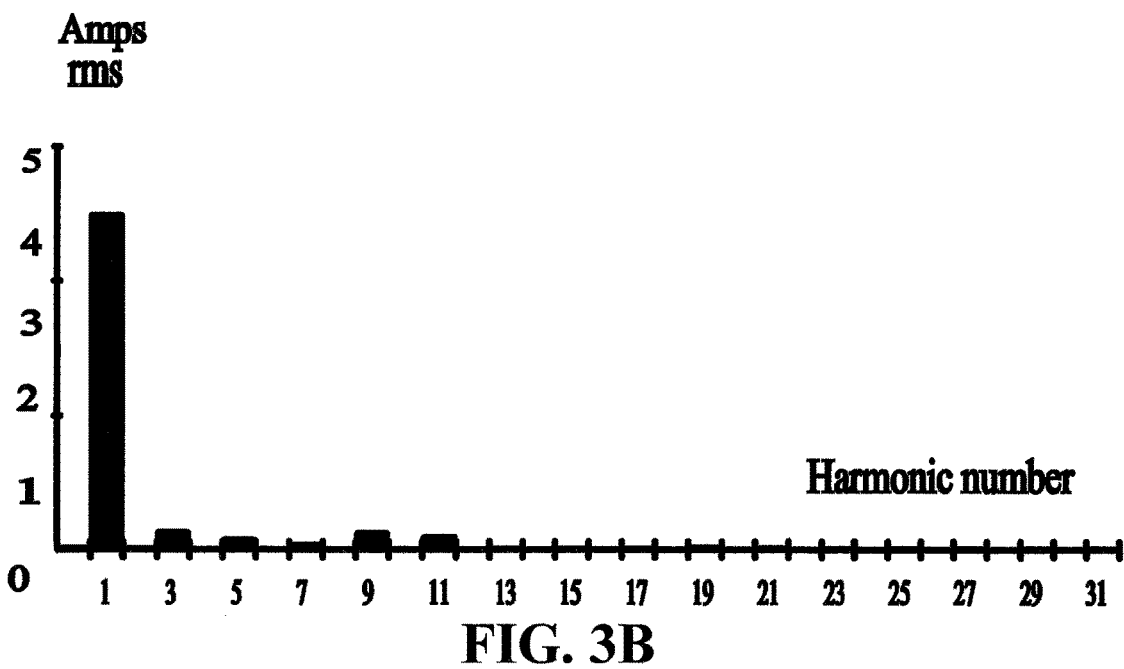
Figure 3C:
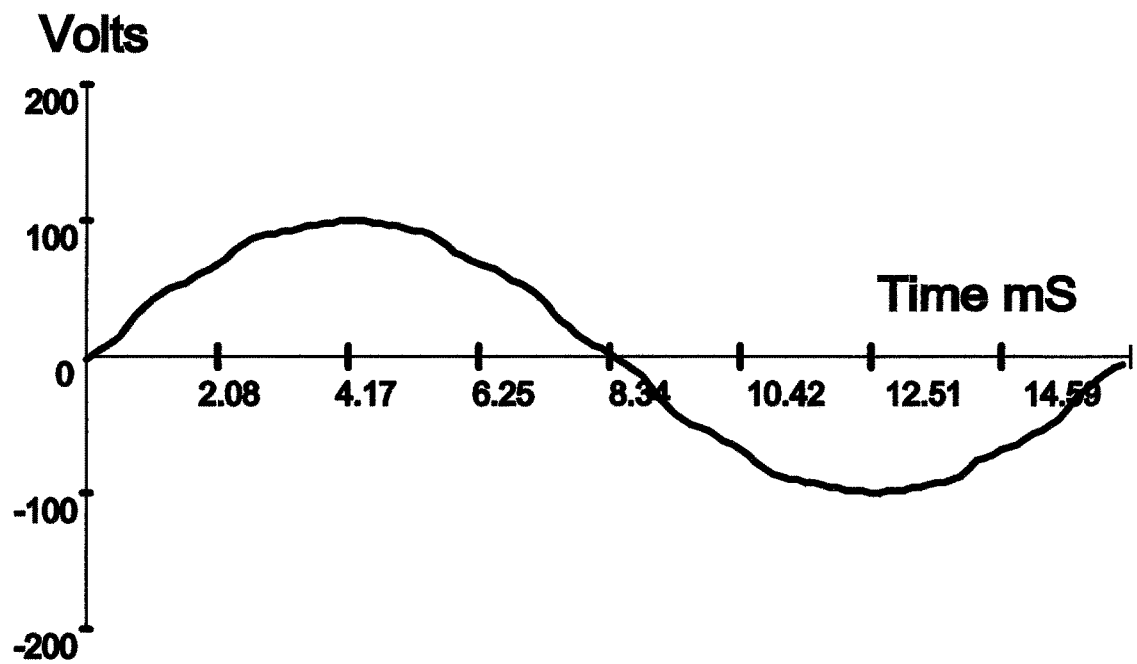
Figure 3D:
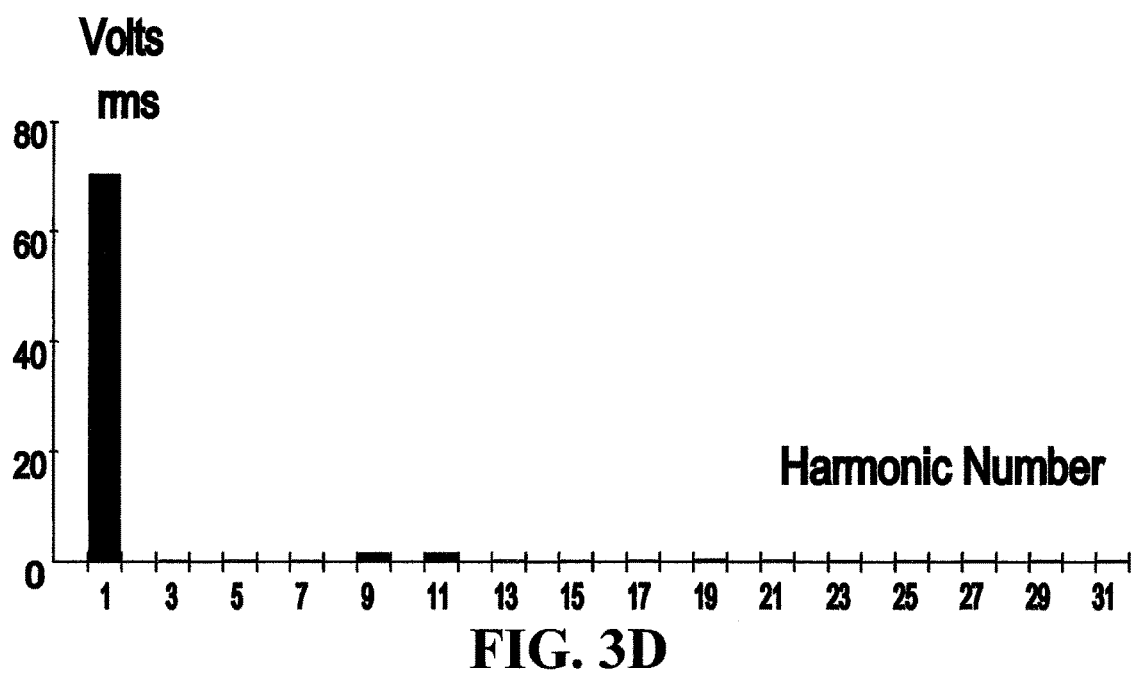
Figure 3E:
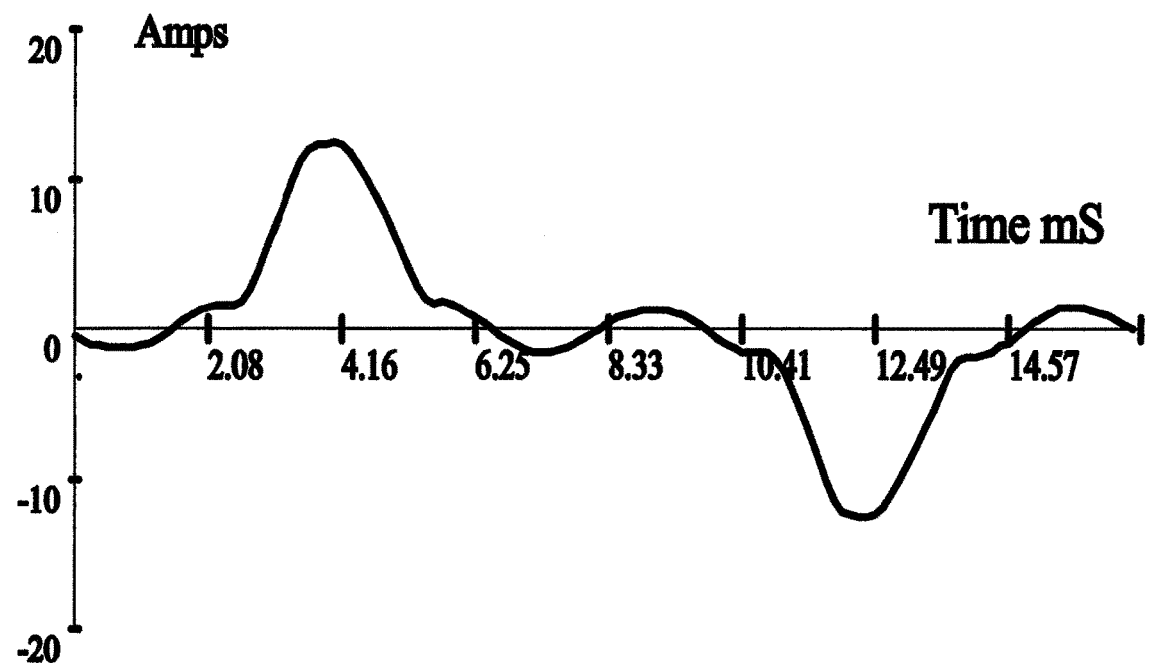
Figure 3F:
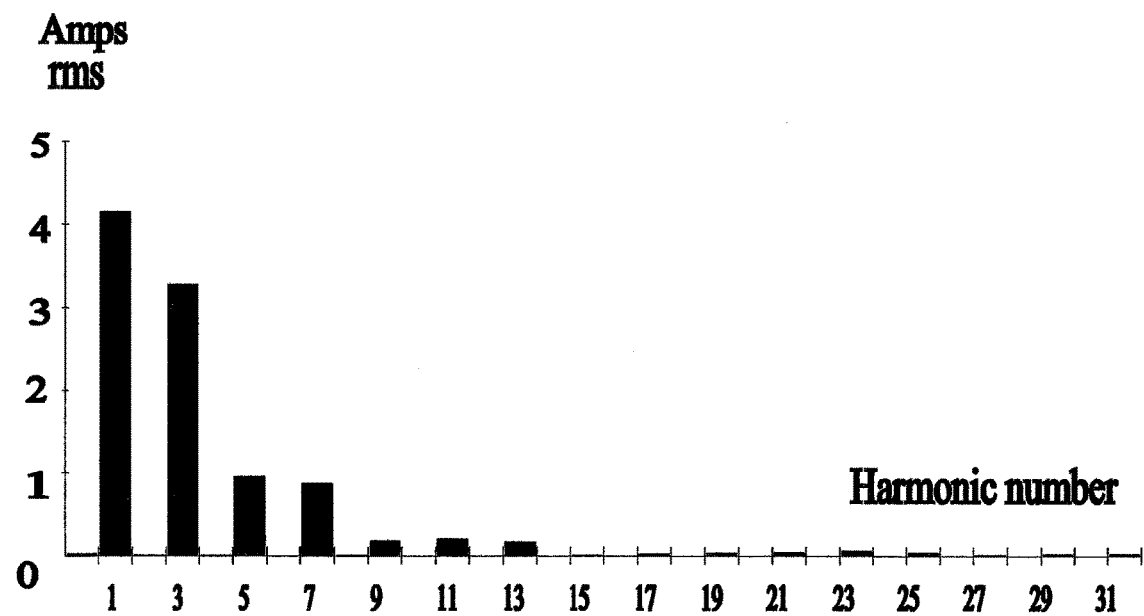
Figure 3G:
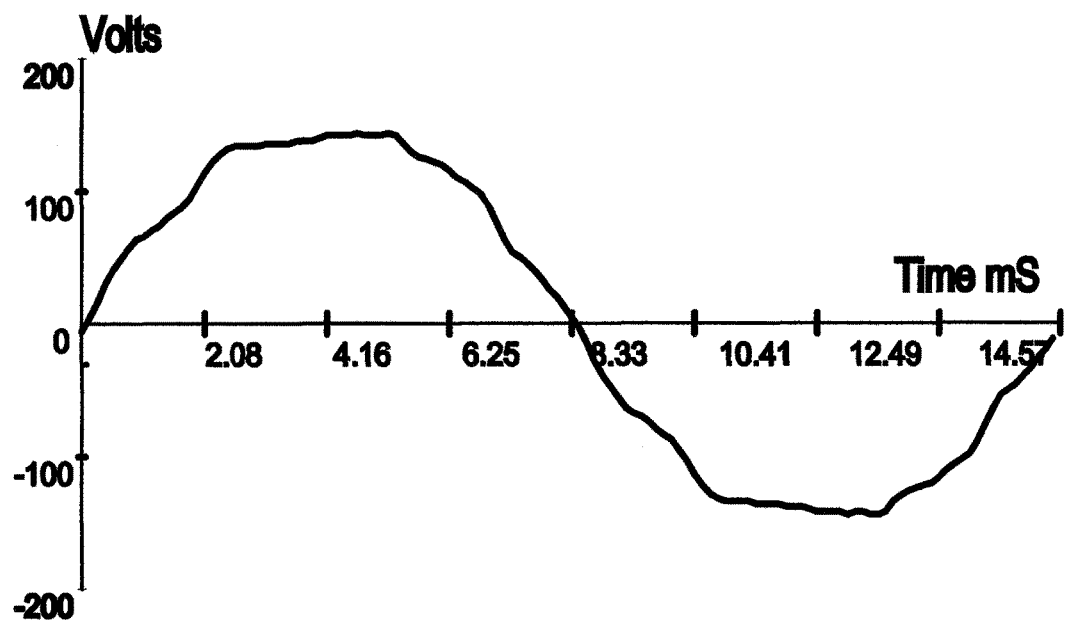
Figure 3H:
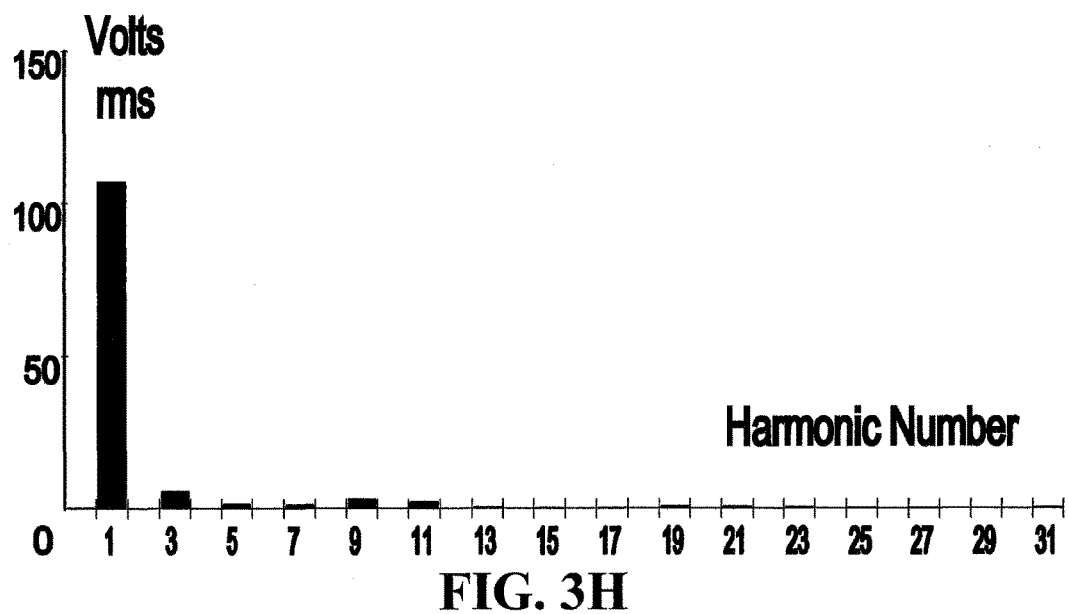

FIGS. 2G and 3H shows graph and harmonic chart of voltages on the five phase side measured on the bus-burs 5, refereed in the Table 2.

FIG. 3 represent a five phase distribution power system with balanced nonlinear load 72, connected on bus burs 5, via five phase cable 14, to three to five phase power distribution transformer converter 10 and five phase zero sequence fifth harmonic filter 22. The three to five phase power distribution transformer converter 10, connected on the bus-burs 4 to the three phase AC systems 8.

FIGS. 3A and 3B shows graph and harmonic chart of current on the three phase side refereed in the Table 3.

FIGS. 3C and 3D shows graph and harmonic chart of voltages on the three phase side measured on the bus-burs 4, refereed in the Table 3.

FIGS. 3E and 3F shows graph and harmonic chart of current on the five phase side measured on the cable 14, refereed in the Table 4.

FIGS. 3G and 3H shows graph and harmonic chart of voltages on the five phase side measured on the bus-burs 5, refereed in the Table 4.

Figure 3I:
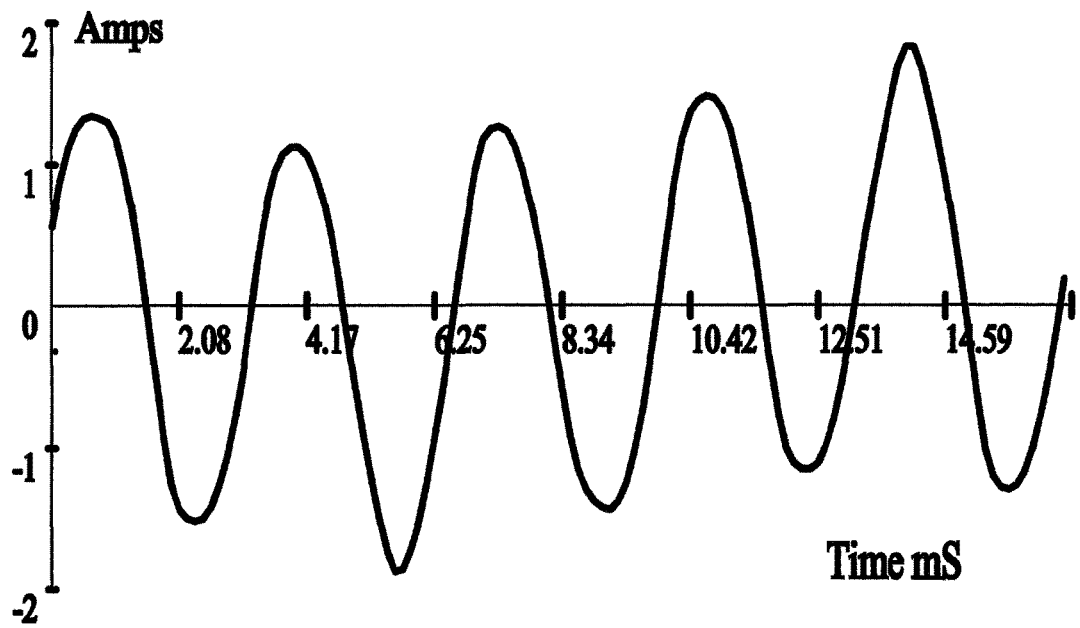
Figure 3J:
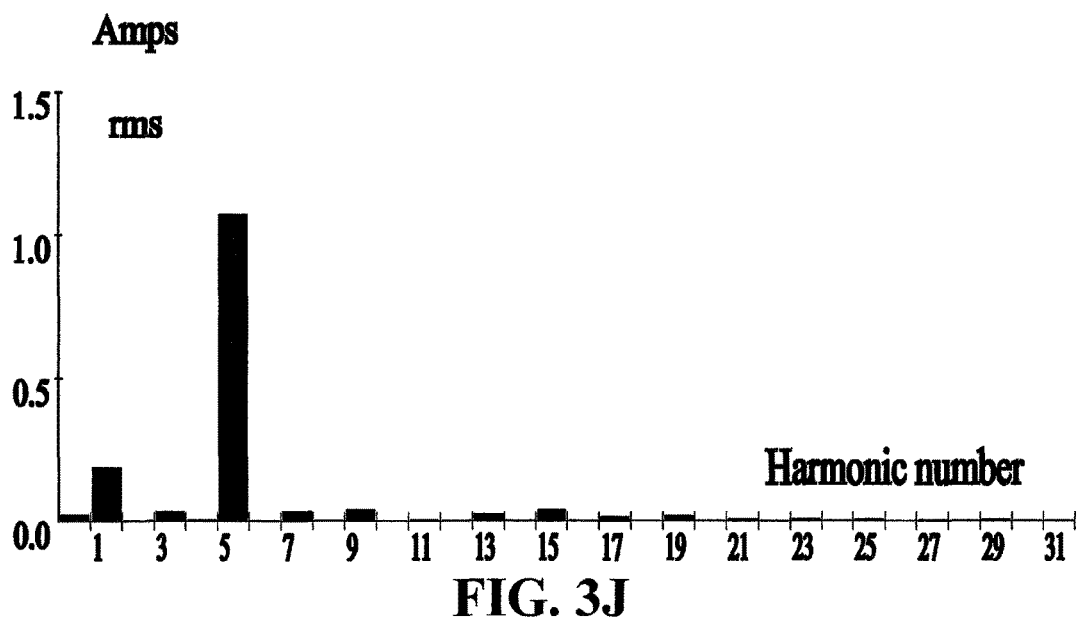

FIGS. 3I and 3J shows graph and harmonic chart of currents on the five phase zero sequence fifth harmonic filter 22, refereed in the Table 4.

Figure 4:
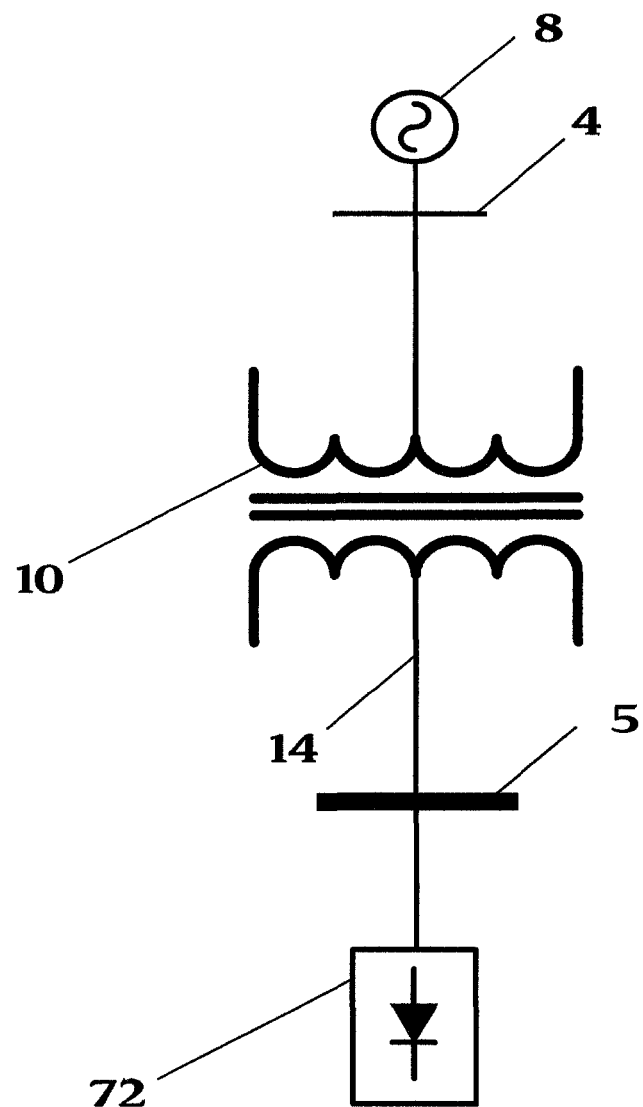
FIGS. 4 and 4A through 4H are schematic diagrams and graphs of a five phase distribution power system with unbalanced nonlinear load.

FIG. 4 shows a five phase distribution power system with unbalanced nonlinear load 72, connected on bus burs 5, via five phase cable 14, to three to five phase power distribution transformer converter 10. The three to five phase power distribution transformer converter 10, is connected on the bus-burs 4 to the three phase AC systems 8.

Figure 4A:
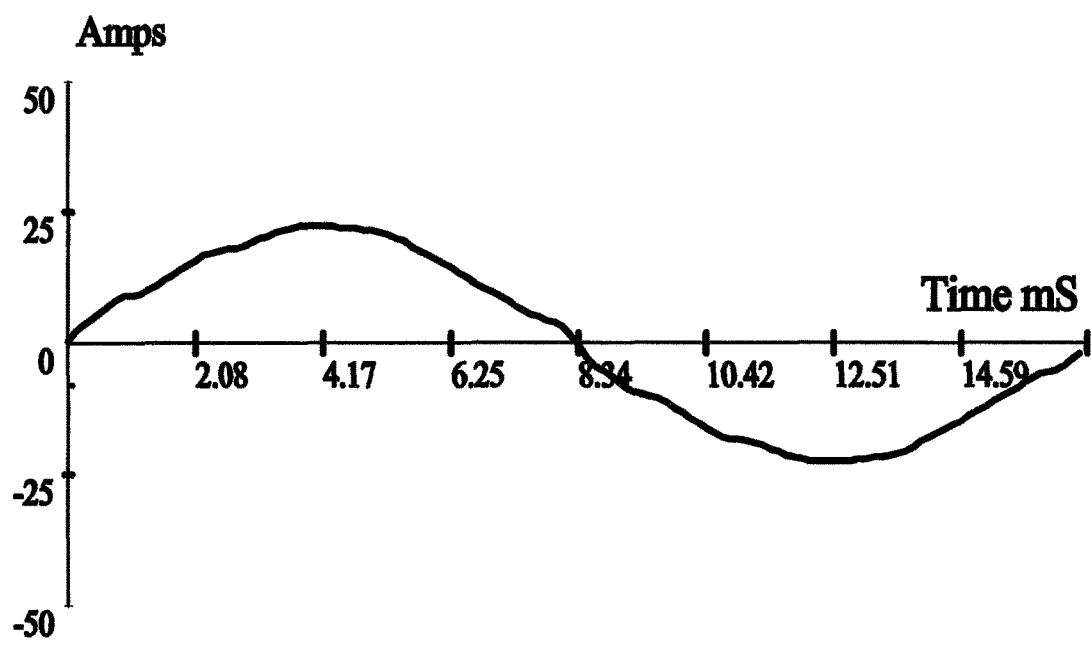
Figure 4B:
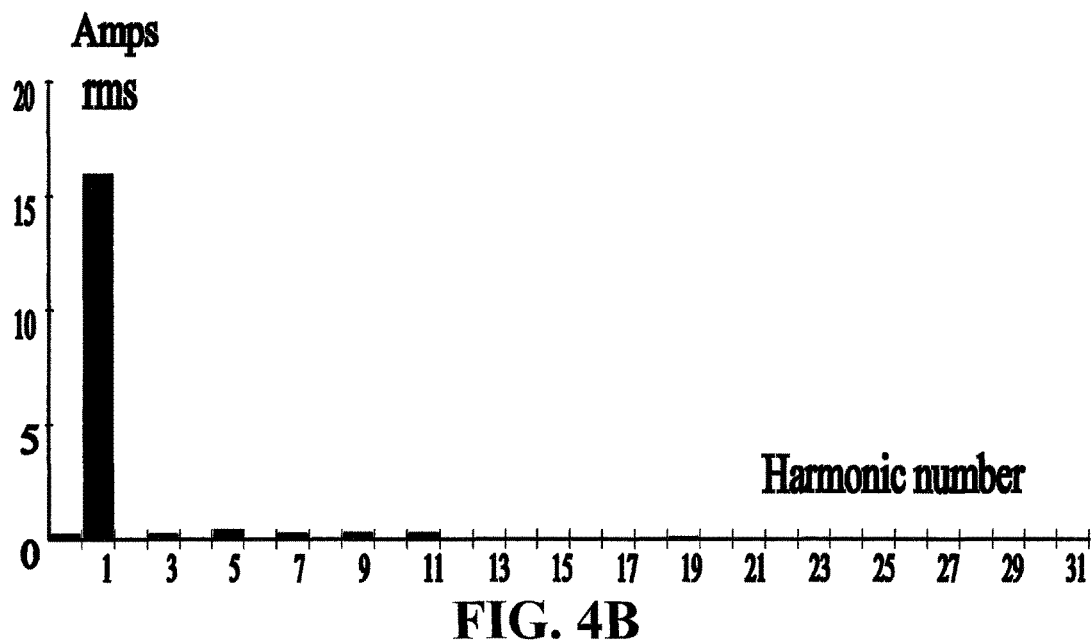

FIGS. 4A and 4B shows graph and harmonic chart of current on the three phase side, refereed in the Table 5.

Figure 4C:
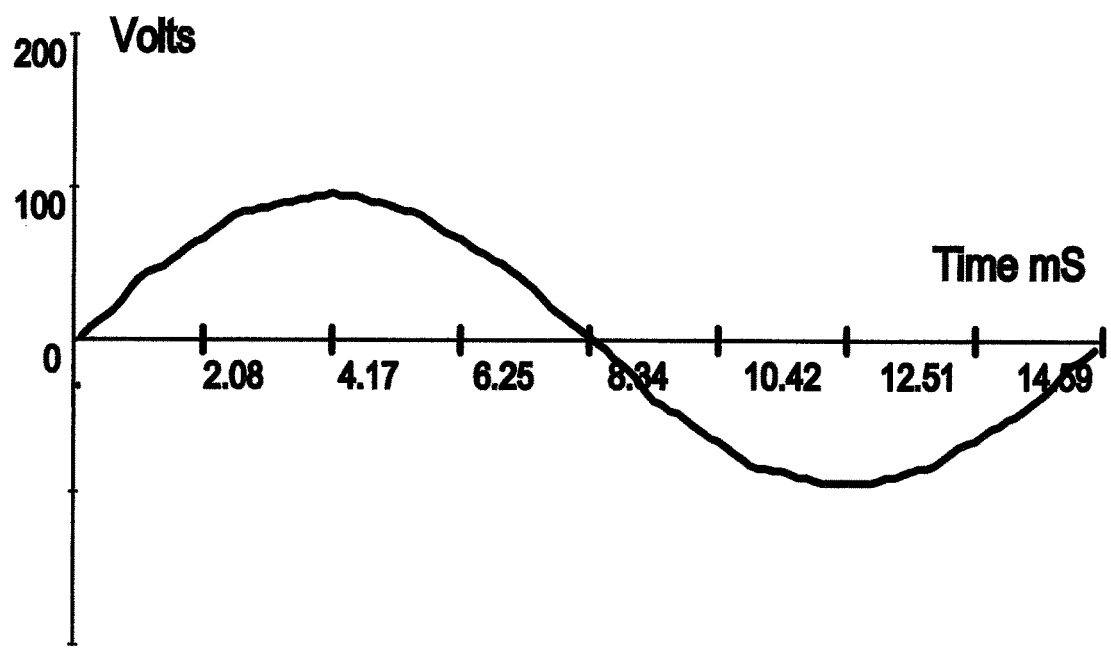
Figure 4D:
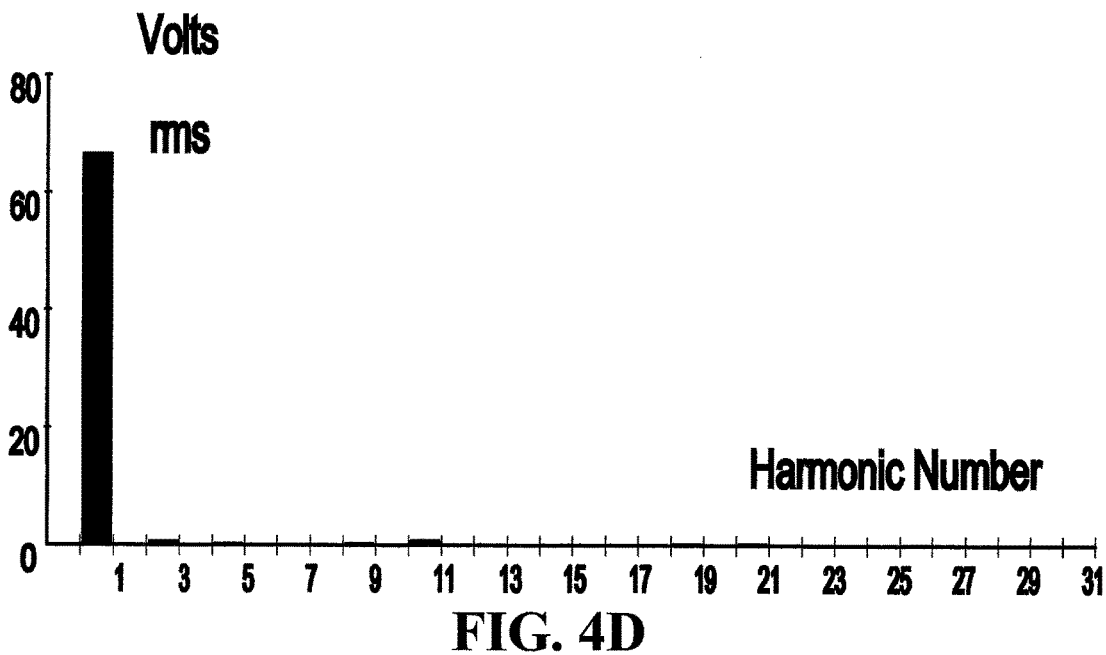

FIGS. 4C and 4D shows graph and harmonic chart of voltages on the three phase side, measured on the bus-burs 4, refereed in the Table 5.

Figure 4E:
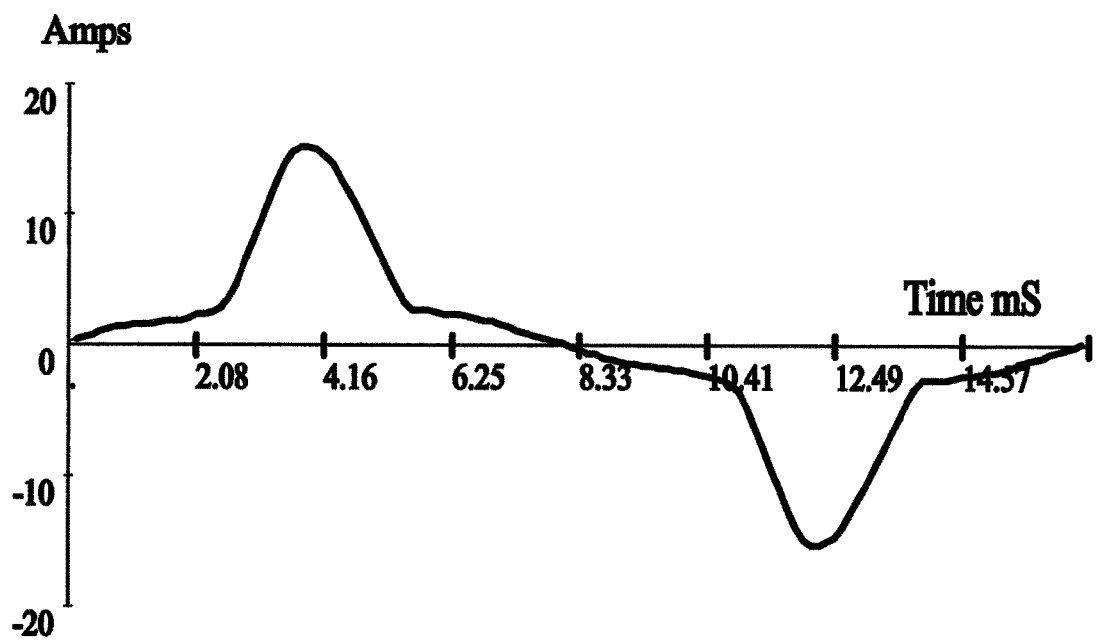
Figure 4F:
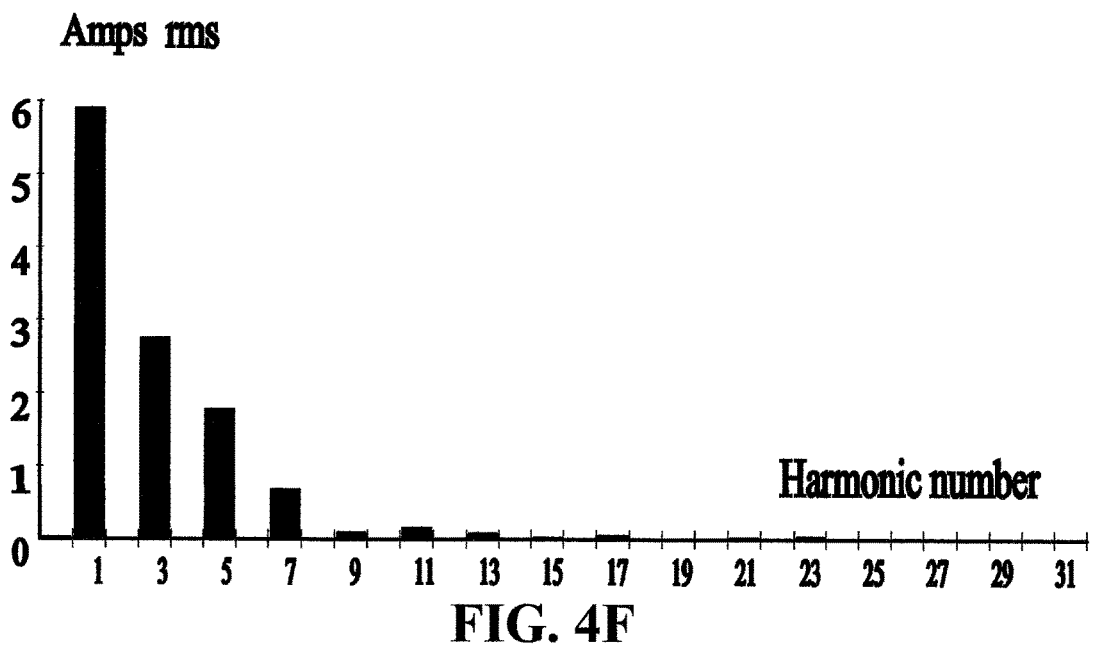

FIGS. 4E and 4F shows graph and harmonic chart of current on the five phase side, measured on the cable 14, refereed in the Table 6.

Figure 4G:
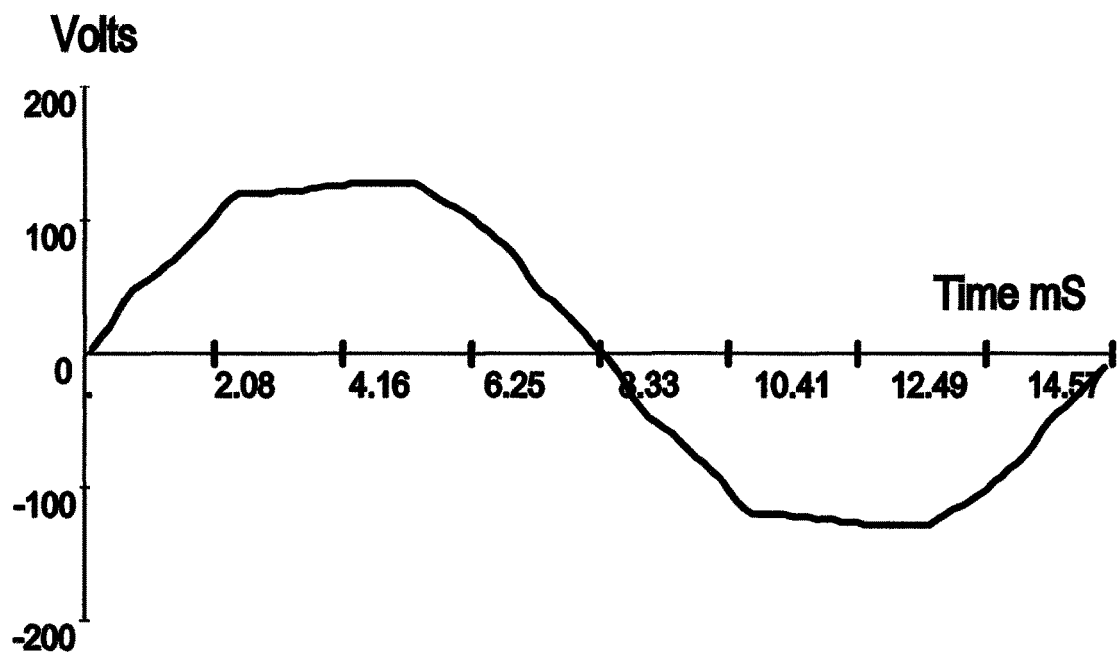
Figure 4H:
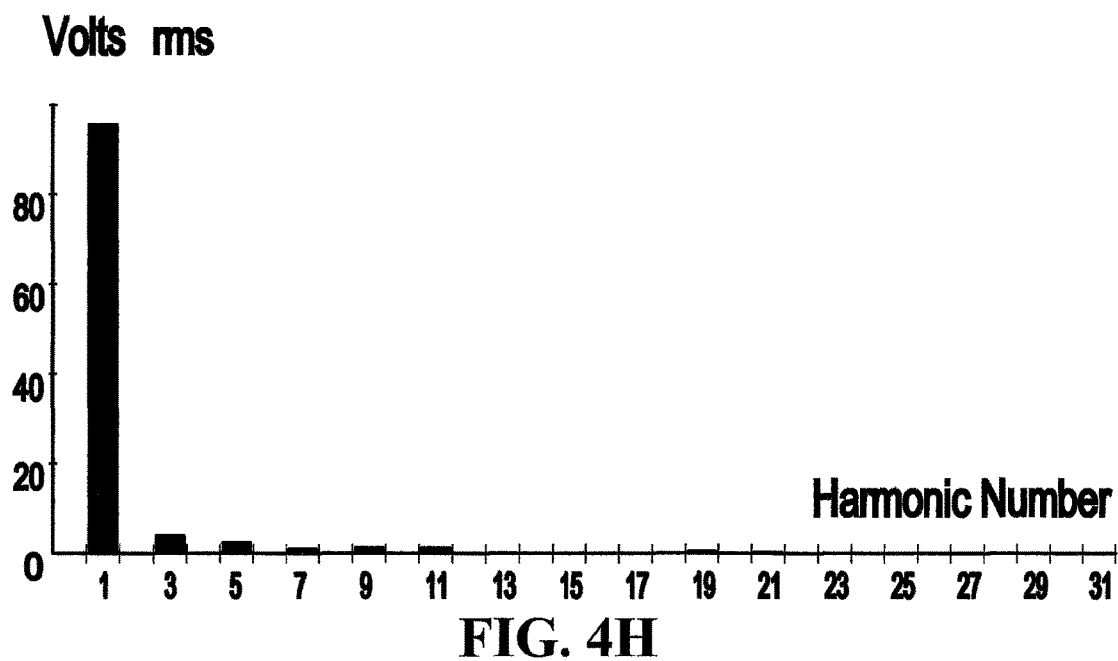

FIGS. 4G and 4H shows graph and harmonic chart of voltages on the five phase side measured on the bus-burs 5, refereed in the Table 6.

Figure 5:
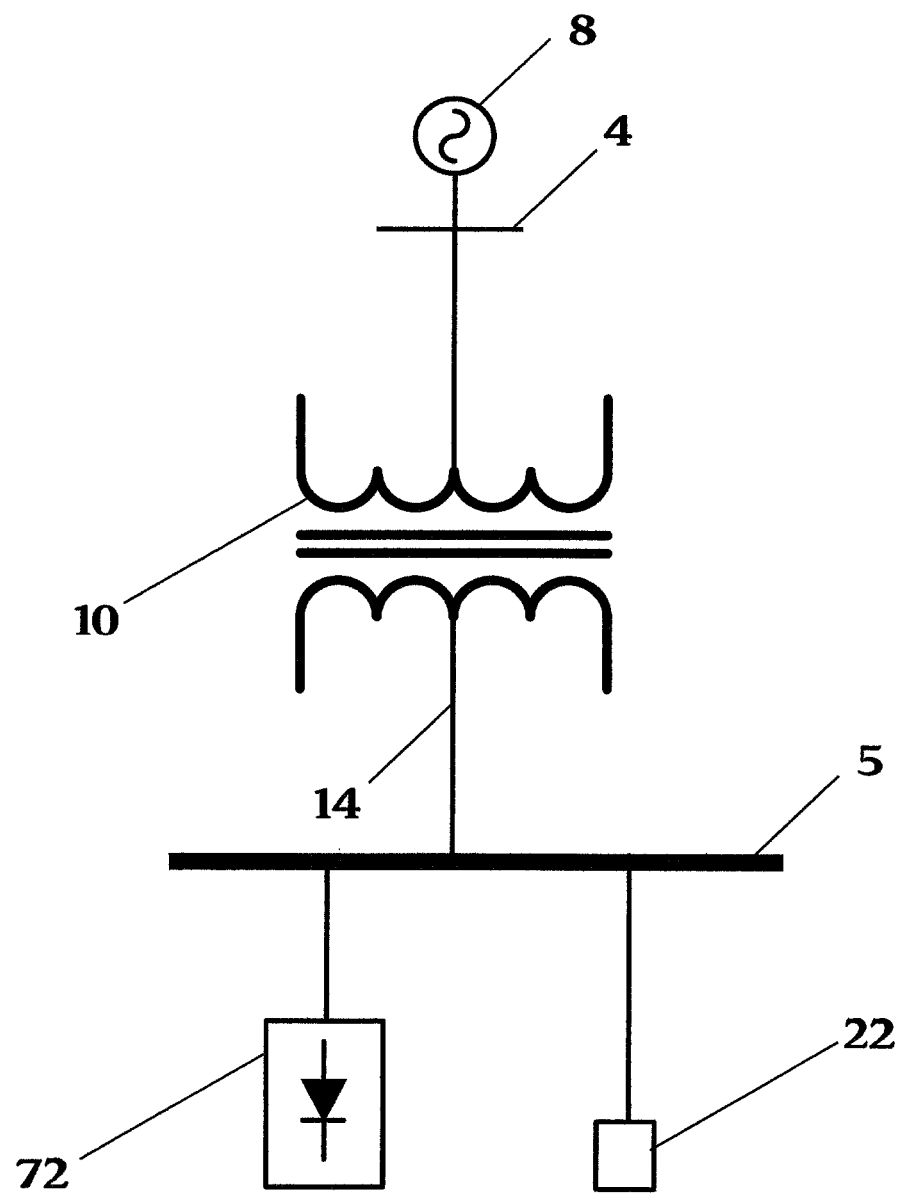
FIGS. 5 and 5A through 5J are schematic diagrams and graphs of a five phase distribution power system with unbalanced nonlinear load, and $5^{th}$ harmonic, five phase zero sequence harmonic filter.

FIG. 5 represent a five phase distribution power system with unbalanced nonlinear load 72, connected on bus burs 5, via five phase cable 14, to three to five phase power distribution transformer converter 10 and five phase zero sequence fifth harmonic filter 22. The three to five phase power distribution transformer converter 10, connected on the bus-burs 4 to the three phase AC systems 8.

Figure 5A:
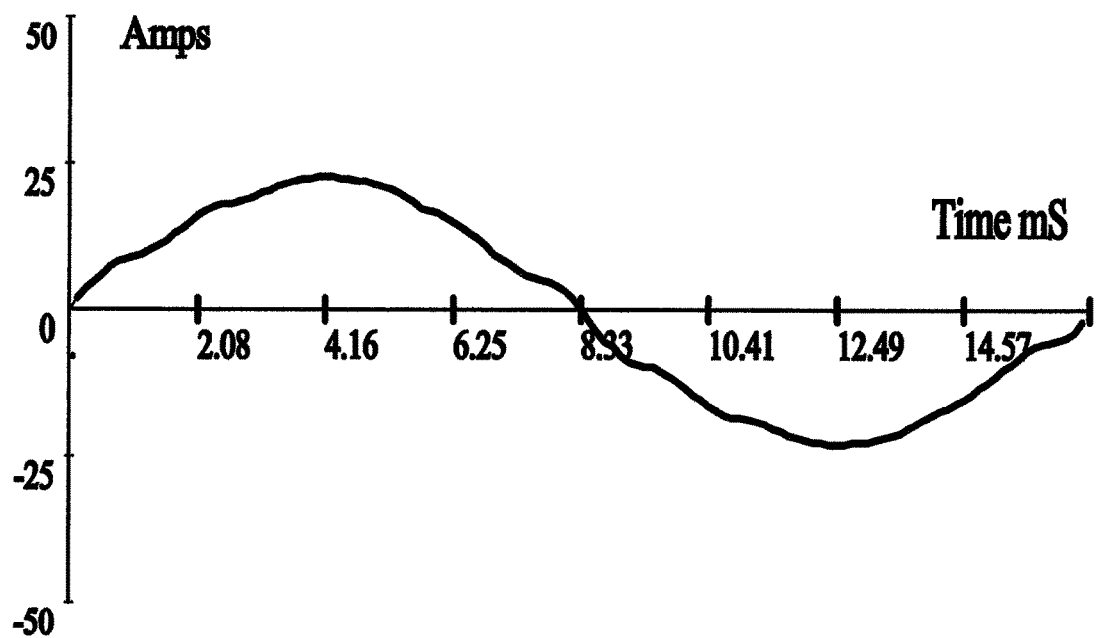
Figure 5B:
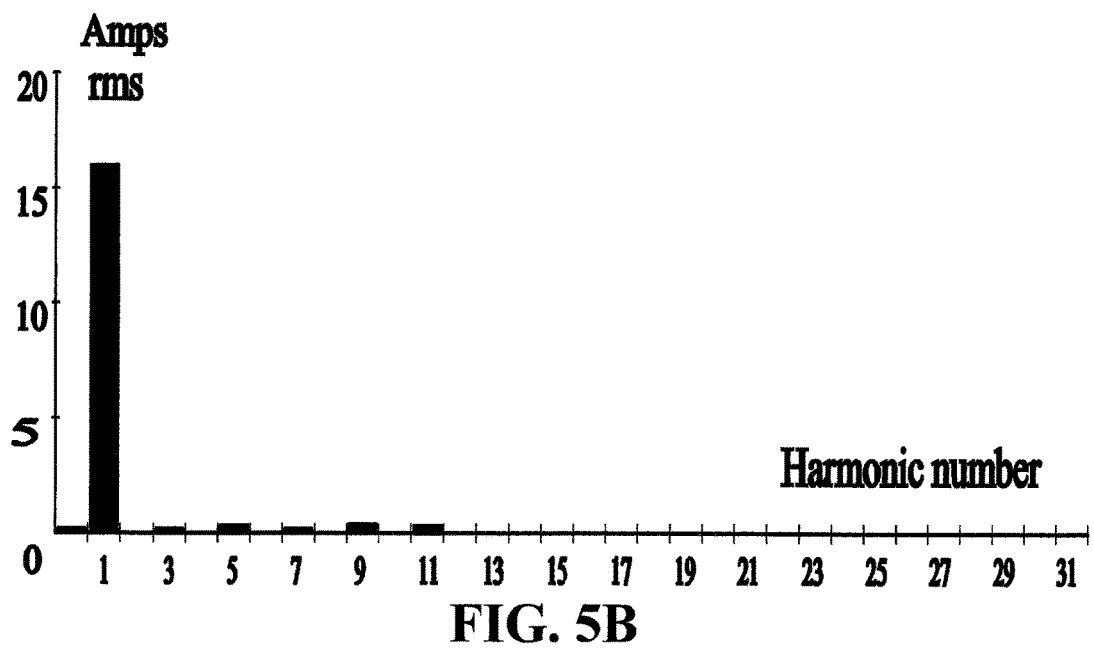

FIGS. 5A and 5B shows graph and harmonic chart of current on the three phase side refereed in the Table 6.

Figure 5C:
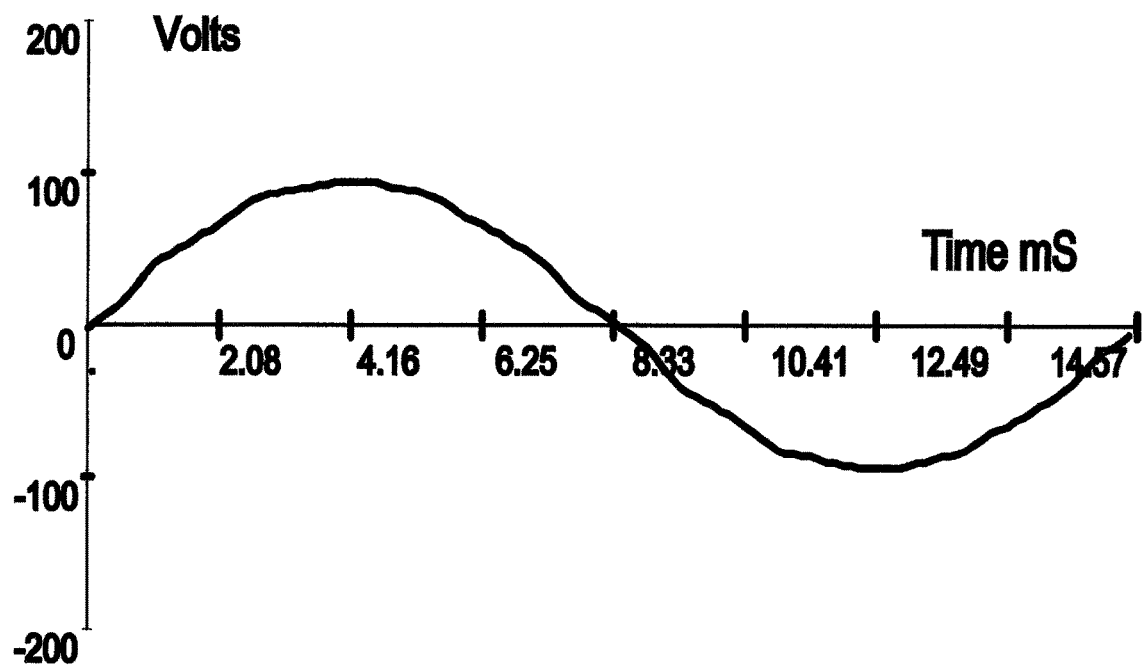
Figure 5D:
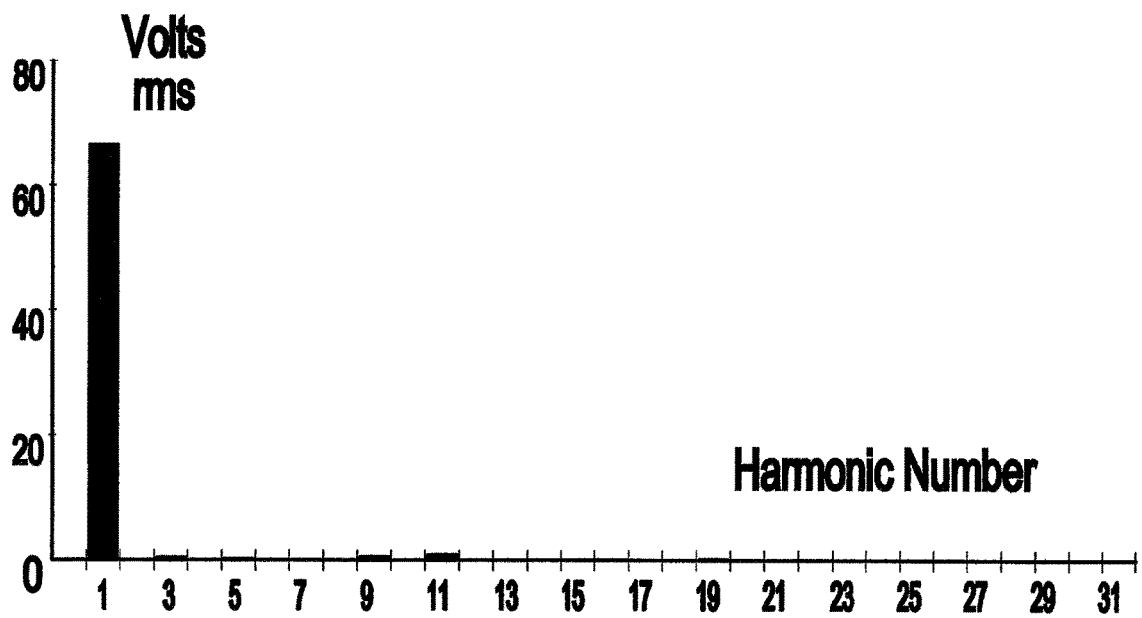

FIGS. 5C and 5D shows graph and harmonic chart of voltages on the three phase side measured on the bus-burs 4, refereed in the Table 7.

Figure 5E:
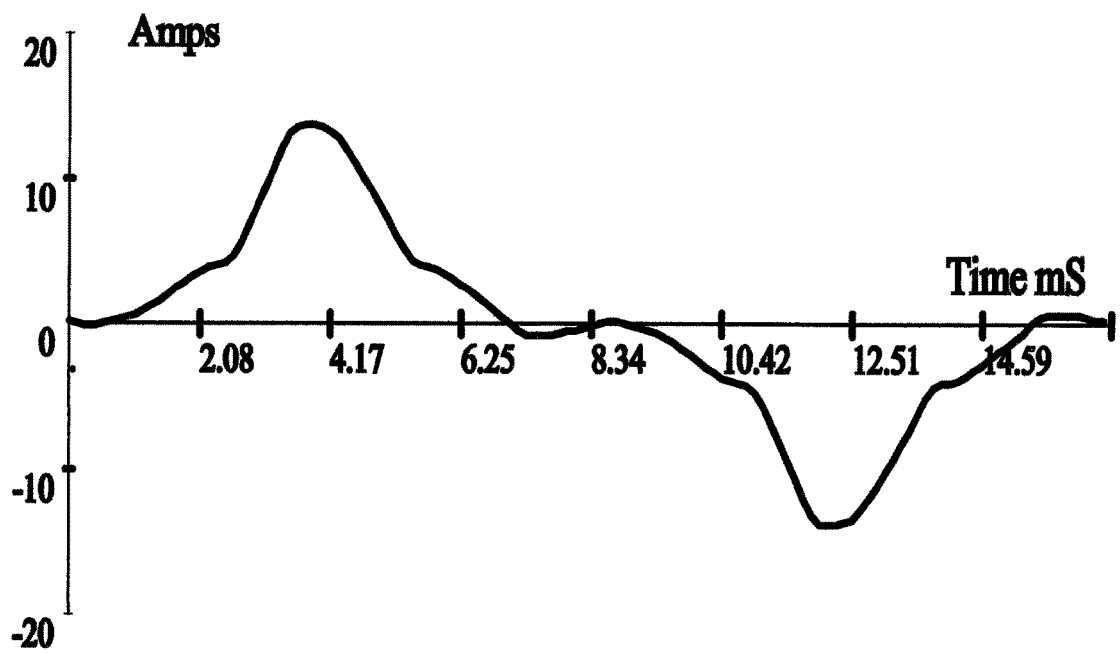
Figure 5F:
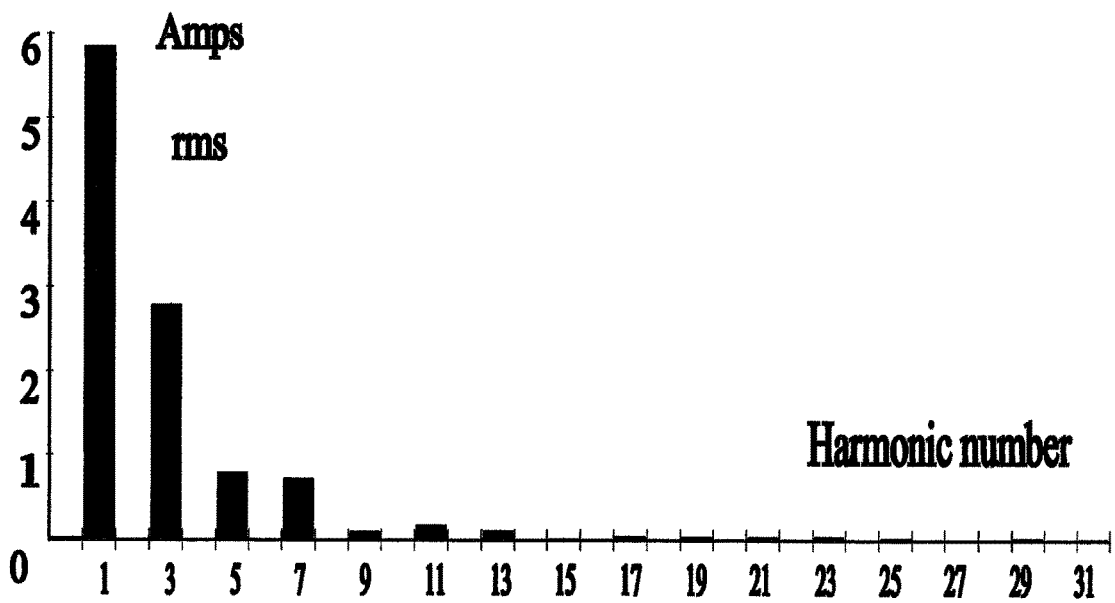

FIGS. 5E and 5F shows graph and harmonic chart of current on the five phase side measured on the cable 14, refereed in the Table 7.

Figure 5G:
Figure 5H:
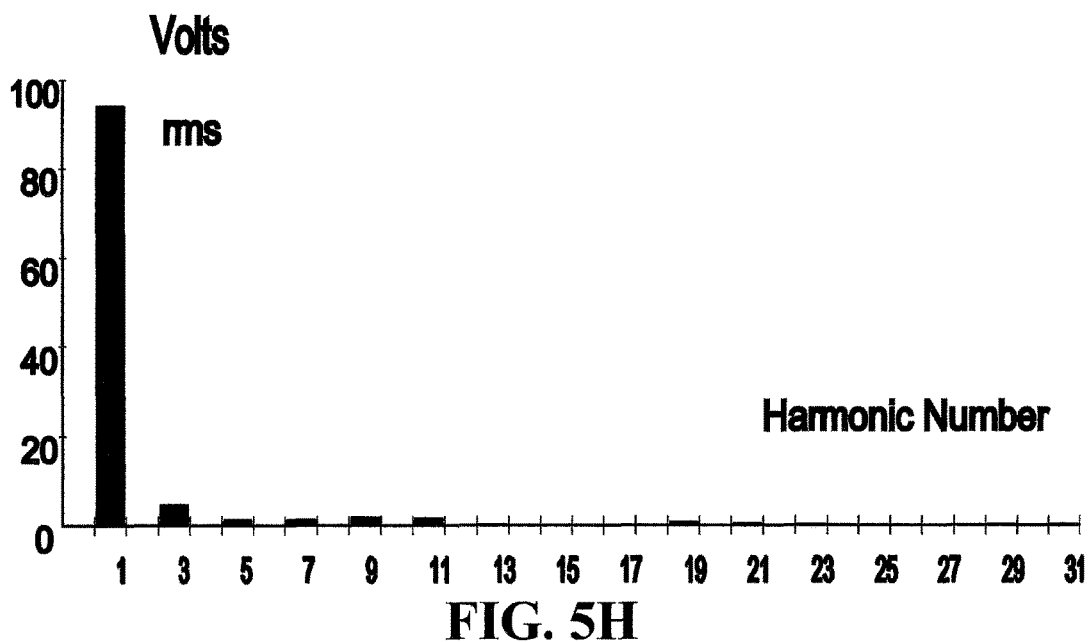

FIGS. 5G and 5H shows graph and harmonic chart of voltages on the five phase side measured on the bus-burs 5, refereed in the Table 8.

Figure 5I:
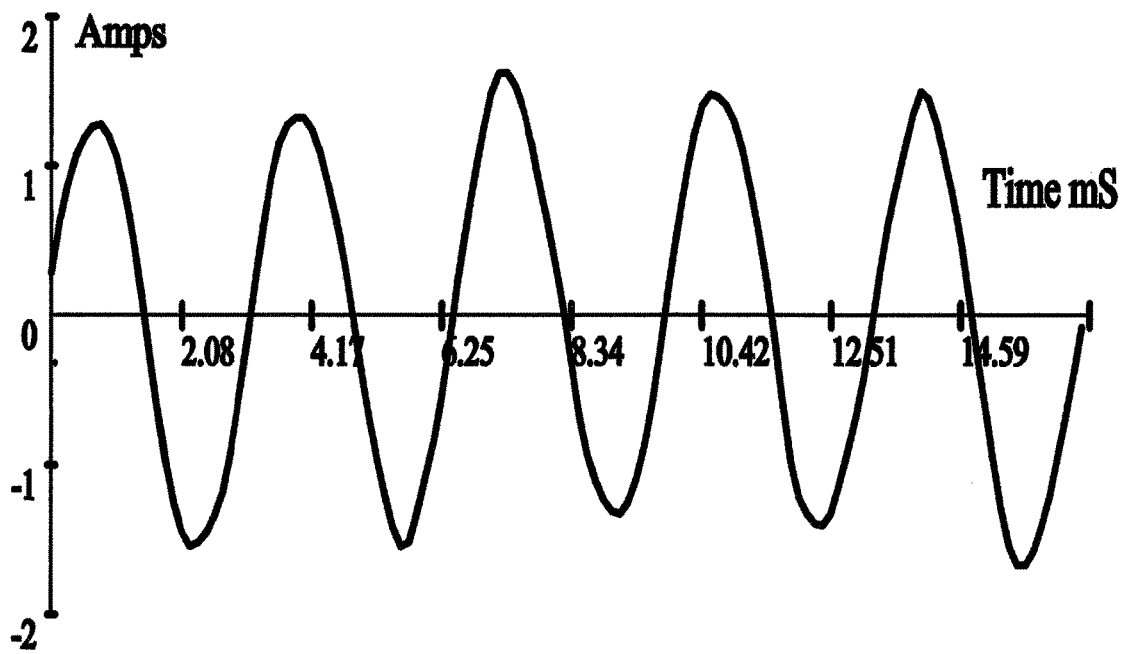
Figure 5J:
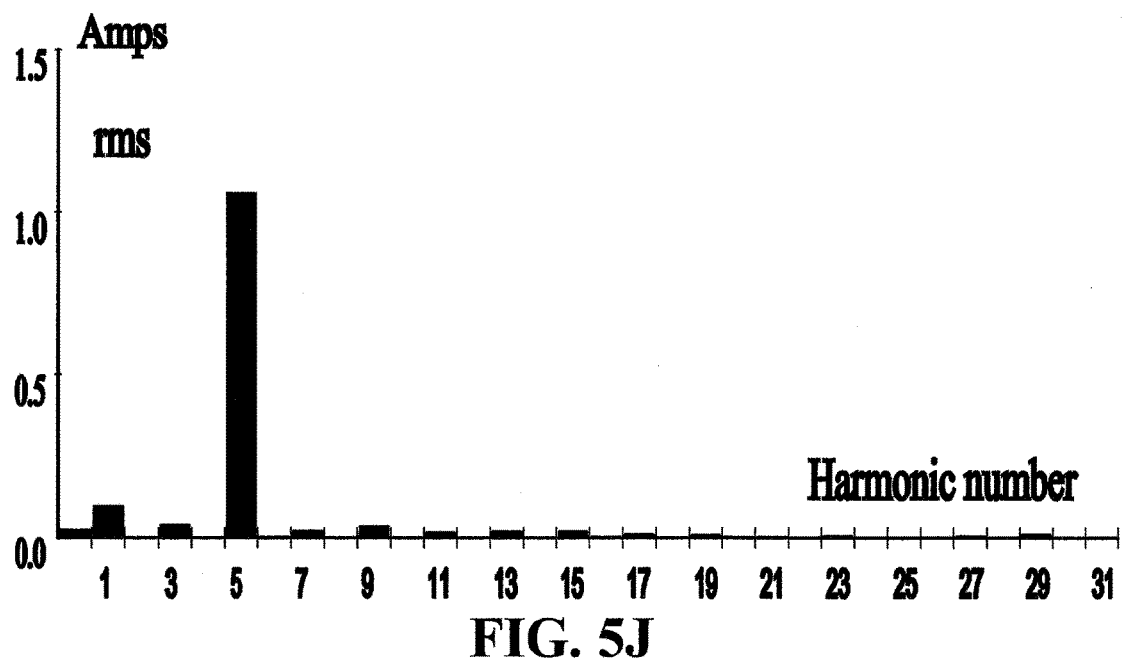

FIGS. 5I and 5J shows graph and harmonic chart of currents on the five phase zero sequence fifth harmonic filter 22, refereed in the Table 8.

Such components are individually configured and correlated with respect to each other so as to attain the desired objectives of increasing efficiency and for reducing harmonics.

In the operation of the preferred embodiment of the new proposed five phase distribution system, the present invention proposes a five phase distribution power system connected to a three phase grid, with the same frequency. The proposed system has five phases output voltages of equal amplitude and frequency but differing in phase by 72 degrees from each other, and therefore can supply five phases or less linear or nonlinear loads or sub-systems. The voltage and constant frequency available grid supply can be transformed to the voltage and constant frequency five phase output supply.

Since input is a three-phase system, the windings of the three to five phase power distribution converter are connected in an usual fashion. The output/secondary side connection is a special design to create five phase system. The designed transformation system can have any input-output ratio, unity, step-up or step-down. For balanced three phase input voltages, the output will have five phase balanced voltages. Any unbalancing in the input will be directly reflect in the output voltages.

Examples of Five Phase System

The three to five phase power transformer converter is fed by a conventional 120/208 V, 60 Hz, three phase system via auto transformer, 120/120 V system. The three/five phase power converter is primary: 120 V, three phase delta connected; secondary is five phase 120 V, phase to ground, star connected. Nonlinear loads are five single phase nonlinear load connected phase to neutral, via 20 foot single phase cable, consisting of five single phase bridge rectifiers, 1 kW resistors and 3000 micro farad smoothing capacitor. The five single phase nonlinear load can be considered as five phase balanced nonlinear load. The system also have a five phase zero sequence harmonic filter, and five 300 watt single phase resistors. Note that in the five phase system zero sequence harmonics are 5th harmonic and its multiples.

System with Balanced Nonlinear Load

Single line diagram with voltage and current shape and harmonic profiles for each line segment is shown in FIG. 2. In Tables 1 and 2, there are shown harmonic profiles on the three and five voltage side. Measured voltages on three phase side are phase to ground. It is to be noted that on the three phase voltage side, the third and the fifth current harmonics are tremendously, almost completely, reduced as well as the THD's are lowered.

TABLE 1

Three phase side with five phase balanced load

| Harmonic | $I_A$ [A] | $I_B$ [A] | $I_C$ [A] | $V_A$ [V] |
|---|---|---|---|---|
| 1 | 12.36 | 11.99 | 11.80 | 70.3 |
| 3 | 0.81 | 0.81 | 0.50 | 0.13 |
| 5 | 0.35 | 0.49 | 0.51 | 0.23 |
| 7 | 0.20 | 0.21 | 0.12 | 0.14 |
| 9 | 0.49 | 0.46 | 0.32 | 1.12 |
| 11 | 0.43 | 0.37 | 0.21 | 1.31 |
| RMS | 12.41 | 12.04 | 11.82 | 70.41 |
| THD[%] | 9.00 | 9.50 | 7.41 | 2.61 |

TABLE 2

Three phase side with five phase nonlinear balanced load

| Harmonic | $I_A$ [A] | $I_B$ [A] | $I_C$ [A] | $I_D$ [A] | $I_E$ [A] | $V_A$ [V] |
|---|---|---|---|---|---|---|
| 1 | 4.32 | 4.12 | 4.30 | 3.80 | 4.12 | 108.40 |
| 3 | 3.22 | 3.48 | 3.44 | 3.27 | 3.29 | 3.10 |
| 5 | 2.37 | 2.04 | 2.16 | 2.13 | 2.12 | 2.41 |
| 7 | 0.89 | 1.09 | 1.05 | 0.77 | 1.89 | 1.23 |
| 9 | 0.16 | 0.23 | 0.22 | 0.12 | 0.89 | 2.45 |
| 11 | 0.21 | 0.39 | 0.24 | 0.18 | 0.13 | 2.24 |
| RMS | 5.95 | 5.88 | 6.02 | 5.45 | 5.76 | 18.67 |
| THD[%] | 94.5 | 101.9 | 97.9 | 102.7 | 97.8 | 6.26 |

System with Balanced Nonlinear Load and Five Phase Zero Sequence Harmonic Filter Single line diagram with voltage and current shape and harmonic profiles for each line segment is shown in FIG. 3. In Tables 3 and 4, there are shown harmonic profiles on the three and five voltage side. Measured voltages on three phase side are phase to ground.

Note that the five phase zero sequence harmonic filter is mitigating 5th harmonics on the five phase bus. So the 5$^{th}$ harmonics are reduced in the five phase system.

On the three phase side, the third and the fifth current harmonics are tremendously, almost completely, reduced as well as the THD is lowered significantly.

TABLE 3

Three phase side with five phase balanced nonlinear load and five phase zero sequence filters.

| Harmonic | $I_A$ [A] | $I_B$ [A] | $I_C$ [A] | $V_A$ [V] |
|---|---|---|---|---|
| 1 | 11.60 | 12.03 | 12.45 | 70.10 |
| 3 | 0.27 | 0.64 | 0.62 | 0.11 |
| 5 | 0.39 | 0.48 | 0.37 | 0.21 |
| 7 | 0.46 | 0.20 | 0.19 | 0.22 |
| 9 | 0.54 | 0.58 | 0.63 | 1.41 |
| 11 | 0.36 | 0.41 | 0.46 | 1.42 |
| RMS | 11.64 | 12.09 | 12.58 | 70.20 |
| THD[%] | 7.12 | 9.91 | 9.61 | 3.00 |

TABLE 4

Five phase side with five phase balanced nonlinear load and five phase zero sequence filters:

| Harmonic | $I_A$ [A] | $I_B$ [A] | $I_C$ [A] | $I_D$ [A] | $I_E$ [A] | $I_{ZSF}$ [A] | $V_A$ [V] |
|---|---|---|---|---|---|---|---|
| 1 | 4.29 | 3.80 | 4.18 | 3.81 | 4.15 | 0.13 | 106.5 |
| 3 | 3.17 | 3.24 | 3.35 | 3.10 | 3.28 | 0.06 | 5.8 |
| 5 | 1.11 | 1.11 | 1.18 | 0.93 | 0.95 | 1.05 | 1.6 |
| 7 | 0.94 | 1.08 | 1.07 | 0.92 | 0.87 | 0.05 | 1.3 |
| 9 | 0.17 | 0.23 | 0.25 | 0.16 | 0.18 | 0.03 | 2.7 |
| 11 | 0.13 | 0.13 | 0.09 | 0.20 | 0.20 | 0.01 | 2.2 |
| RMS | 5.54 | 5.24 | 5.60 | 5.10 | 5.46 | 1.07 | 106.7 |
| THD[%] | 81.6 | 94.9 | 89.1 | 88.7 | 85.2 | 6.7 | 6.8 |

System with Unbalanced Nonlinear Load

A single line diagram with voltage and current shape and harmonic profiles for each lien segment is shown in FIG. 4. In Tables 5 and 6, there are shown harmonic profiles on the three and five voltage side. Measured voltages on three phase side are phase to ground.

TABLE 5

Three phase side with five phase unbalanced nonlinear load:

| Harmonic | $I_A$ [A] | $I_B$ [A] | $I_C$ [A] | $V_A$ [V] |
|---|---|---|---|---|
| 1 | 16.00 | 14.3 | 12.81 | 66.7 |
| 3 | 0.21 | 0.64 | 0.22 | 0.82 |
| 5 | 0.42 | 0.42 | 0.32 | 0.33 |
| 7 | 0.32 | 0.31 | 0.12 | 0.14 |
| 9 | 0.32 | 0.35 | 0.17 | 0.42 |
| 11 | 0.32 | 0.23 | 0.19 | 0.91 |
| RMS | 16.0 | 14.4 | 12.81 | 66.7 |
| THD[%] | 4.5 | 5.9 | 3.8 | 2.2 |

TABLE 6

Five phase side with five phase unbalanced nonlinear load

| Harmonic | $I_A$ [A] | $I_B$ [A] | $I_C$ [A] | $I_D$ [A] | $I_E$ [A] | $V_A$ [V] |
|---|---|---|---|---|---|---|
| 1 | 5.91 | 3.74 | 4.98 | 6.28 | 3.62 | 95.6 |
| 3 | 2.75 | 2.97 | 2.87 | 2.72 | 3.06 | 4.3 |
| 5 | 1.78 | 1.86 | 1.82 | 1.85 | 1.97 | 2.5 |
| 7 | 0.68 | 0.65 | 0.70 | 0.67 | 0.85 | 1.1 |
| 9 | 0.10 | 0.12 | 0.09 | 0.09 | 0.16 | 1.5 |
| 11 | 0.17 | 0.10 | 0.08 | 0.07 | 0.12 | 1.6 |

TABLE 6-continued

Five phase side with five phase unbalanced nonlinear load

| Harmonic | $I_A$ [A] | $I_B$ [A] | $I_C$ [A] | $I_D$ [A] | $I_E$ [A] | $V_A$ [V] |
|---|---|---|---|---|---|---|
| RMS | 6.80 | 5.17 | 6.07 | 7.13 | 5.21 | 96.0 |
| THD[%] | 56.80 | 95.5 | 69.8 | 53.6 | 103.70 | 5.6 |

System with Unbalanced Nonlinear Load and Five Phase Zero Sequence Filter

A single line diagram with voltage and current shape and harmonic profiles for each line segment is shown in FIG. 5. Five phase zero sequence filter connected on the load subpanel. In Table 7 and 8 are shown harmonic profiles on the three and five phase sides. Measured voltages on three phase side are phase to ground.

TABLE 7

Three phase side with five phase unbalanced load and five phase zero sequence filters:

| Harmonic | $I_A$ [A] | $I_B$ [A] | $I_C$ [A] | $V_A$ [V] |
|---|---|---|---|---|
| 1 | 16.0 | 14.4 | 12.8 | 66.6 |
| 3 | 0.2 | 0.6 | 0.2 | 0.7 |
| 5 | 0.3 | 0.4 | 0.3 | 0.3 |
| 7 | 0.4 | 0.3 | 0.1 | 0.2 |
| 9 | 0.4 | 0.4 | 0.3 | 0.1 |
| 11 | 0.1 | 0.4 | 0.2 | 0.1 |
| RMS | 16.1 | 14.5 | 12.9 | 66.7 |
| THD[%] | 4.9 | 6.4 | 4.8 | 2.5 |

TABLE 8

Three phase side with five phase unbalanced load and five phase zero sequence filters:

| Harmonic | $I_A$ [A] | $I_B$ [A] | $I_C$ [A] | $I_D$ [A] | $I_E$ [A] | $I_{ZSF}$ [A] | $V_A$ [V] |
|---|---|---|---|---|---|---|---|
| 1 | 5.85 | 3.83 | 5.02 | 3.49 | 5.84 | 0.10 | 94.1 |
| 3 | 2.78 | 2.93 | 2.97 | 2.94 | 2.63 | 0.04 | 5.0 |
| 5 | 0.79 | 0.81 | 0.79 | 0.87 | 0.85 | 1.06 | 5.0 |
| 7 | 0.72 | 0.78 | 0.84 | 0.90 | 0.72 | 0.04 | 1.4 |
| 9 | 0.10 | 0.14 | 0.11 | 0.17 | 0.07 | 0.02 | 2.0 |
| 11 | 0.17 | 0.15 | 0.06 | 0.10 | 0.06 | 0.03 | 1.8 |
| RMS | 6.57 | 4.96 | 5.95 | 4.75 | 6.51 | 1.07 | 94.3 |
| THD[%] | 51.1 | 82.1 | 63.7 | 91.8 | 48.9 | 6.4 | 6.1 |

It is to be noted that on the three phase voltage side the third and the fifth current harmonics are tremendously, almost, completely reduced, as well as the THD's are lowered.

Advantage and Benefits of the Five Phase Systems

There is the need for five-phase distribution system obtained by the three to five phase power transformer converter, from the three phase system. The five-phase transmission system is
  a more efficient, and reliable solution for bulk power transfer.
The advantages and benefits are:
  1. Electronic equipment tends to be distributed in the building on various branch circuits and receptacles or centralized in one area as in a computer, and data centers or drive motor control centers, MCC, where special power provisions are needed. Because of high power per square foot is raised, a five phase power system offers more efficient, reliable, and flexible power delivery.
  2. Reduction of ac input line current harmonics is important. Also, it may be essential to meet harmonic standards.
  3. Eliminating the most prominent harmonics in the system 3rd and 5th, consequentially reduces associated power system losses, thus reducing temperature rise of the power cables and devices.
  4. Increase efficiency of the power system and devices, motors and variable frequency drives with better performances and operation characteristics.
  5. The system does not use PWM technique and power electronics to convert a three phase to a five-phase system. The reliability is much higher since there is no any moving part or power electronics devices.
  6. It does not require a 6, 12, pulse system to reduce harmonics.
  7. It uses only one power transformer and does not need 6-phase and 12-pulse system to produce less ripple.
  8. It is simple, by operation, cost and energy effective and reliable
  9. It does not require multiple phase-shifting transformers of different configurations to treat 3' and $5^{th}$ harmonics produced by loads.
  10. Five phase zero sequence filters, zig-zag reactors, etc., can be used to address five phase zero sequence harmonics 5th and associated problems, high neutral current, voltage distortion, etc.
  11. Five phase systems reduce DC output voltage ripple voltage on converters and drives and mainly have practical effects on the design of the dc circuit filter inductance.
  12. Due to the increase in number of the output phases, the reduction of steady-state current is achieved for the same power.
  13. The transient performance of the three- to five-phase transformer is improved. Inrush current of the three to five phase transformer showing a peak value under the transient condition of the three phase operation.
  14. Active filters will not be required to solve existing harmonic problems. The reliability of five phase is tremendously increased.
  15. It also does not require LC filters for harmonic reductions, so it does not create multiple resonant points, and it can't be overloaded and it does not intercut with the dynamics of the power systems.
  16. It can be used for any systems especially it is very suitable for commercial buildings, data centers, and motor control centers, where the loads are mostly nonlinear with very high power density.
  17. Larger scale three to five phase transformer converters suggest that the best location is where several distorted currents are combined, such as load center.
  18. The harmonic loss and its cost penalty can be significant when the cable is long, due to skin and proximity effects. With the five phase zero sequence filter the fifth harmonic current is reduced thus the losses in the cable can be reduced, as well as the THD of volts and currents.
  19. Harmonic-related losses may be significant, overheating wiring, increasing power bills and tying up capacity of the power system. Reducing harmonics will save energy and release additional capacity to serve other loads.
  20. It is very easy to maintain it. It does not require any special maintenance.

The primary embodiment of the invention is illustrated in FIG. 1. In this embodiment first provided is a five phase power distribution system for providing increased energy efficiency and harmonic reduction. The increased energy efficiency and the harmonic reduction are done in a safe, convenient and economical manner. Next provided is a source of three phase AC electrical potential. Provided next is a three phase to five phase power transformer converter coupled to the source of three phase AC electrical potential. Next provided is a five phase distribution network coupled to the three phase to five phase power transformer converter.

Next provided is a plurality of primary loads coupled to the five phase network. The plurality of primary loads includes a five phase/five phase power transformer and a supplemental network. The plurality of primary loads also includes at least one primary load chosen from the class consisting of a five phase nonlinear load.

Next a plurality of secondary loads is provided coupled to the five phase/five phase power transformer. The plurality of secondary loads is chosen from the class consisting of a five phase nonlinear load, and a five phase zero sequence harmonic filter.

Next provided is a plurality of primary loads coupled to the five phase network. The plurality of primary loads includes a five phase/five phase power transformer and a supplemental network. The plurality of primary loads also includes at least one primary load chosen from the class consisting of a five phase unbalanced nonlinear load.

Lastly, a plurality of tertiary loads are provided coupled to the supplemental distribution network. The plurality of tertiary loads is chosen from the class consisting of a one phase linear load, a five phase linear load, a five phase unbalanced nonlinear load, and a five phase zero sequence harmonic filter.

In one embodiment of the system, the five phase cable is a five phase 20 foot, cable.

FIG. 2 illustrates a system wherein at least one load is a five phase nonlinear load.

FIG. 3 illustrates a system wherein the at least one load includes a load chosen from the class of loads consisting of a five phase nonlinear load and a five phase zero sequence filter.

FIG. 4 illustrates a system wherein the at least one load includes a load chosen from the class of loads consisting of a five phase nonlinear unbalanced load.

FIG. 5 illustrates a system wherein the at least one load includes a load chosen from the class of loads consisting of a five phase nonlinear unbalanced load, and a five phase zero sequence filter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A five phase power distribution system for providing increased energy efficiency and harmonic reduction, the increased energy efficiency and the harmonic reduction being done in a safe, convenient and economical manner, the system comprising, in combination:
a source of three phase AC electrical potential;
a three phase to five phase power transformer converter coupled to the source of three phase AC electrical potential;
a five phase distribution network coupled to the three phase to five phase power transformer converter;
a plurality of supplemental loads coupled to the five phase distribution network, the plurality of supplemental loads including a five phase/five phase power transformer and an additional supplemental distribution network, the plurality of loads also including at least one supplemental loads chosen from the group consisting of a one phase linear load, a five phase or less linear load, and a five phase or less nonlinear load; a plurality of secondary loads coupled to the five phase/five phase power transformer, the plurality of secondary loads chosen from the class consisting of a one phase linear load, a five phase or less linear load, a five phase or less nonlinear load, and a zero sequence five phase harmonic filter; and a plurality of tertiary loads coupled to the supplemental distribution network, the plurality of tertiary loads chosen from the class consisting of a one phase linear load, a five phase or less linear load, a five phase or less nonlinear load, and a zero sequence five phase harmonic filter.

2. The system as set forth in claim 1 wherein the secondary load is a linear one phase load.

3. The system as set forth in claim 1 wherein the secondary load is a linear two phase load.

4. The system as set forth in claim 1 wherein the secondary load is a linear three phase load.

5. The system as set forth in claim 1 wherein the secondary load is a linear four phase load.

6. The system as set forth in claim 1 wherein the secondary load is a linear five phase load.

7. The system as set forth in claim 1 wherein the secondary load is a nonlinear one phase load.

8. The system as set forth in claim 1 wherein the secondary load is a nonlinear two phase load.

9. The system as set forth in claim 1 wherein the secondary load is a nonlinear three phase load.

10. The system as set forth in claim 1 wherein the secondary load is a nonlinear four phase load.

11. The system as set forth in claim 1 wherein the secondary load is a nonlinear five phase load.

12. The system as set forth in claim 1 wherein the five phase distribution network is a five phase network with five phases output voltages of equal amplitude and frequency, and relative phase shift of 72 degrees.

13. The system as set forth in claim 1 wherein the five phase distribution network is a five phase distribution system where the voltage and constant frequency available from three phase AC power source can be transformed to the voltage and constant frequency of five phase AC power source.

14. The system as set forth in claim 1 wherein the at least one secondary load is a five phase nonlinear load.

15. The system as set forth in claim 1 wherein the at least one secondary load includes a five phase nonlinear load and a five phase fifth harmonic zero sequence filter.

16. The system as set forth in claim 1 wherein the at least one secondary load includes a five phase nonlinear unbalanced load.

17. The system as set forth in claim 1 wherein the at least one secondary load includes a five phase or less nonlinear balanced load, a five phase or less linear unbalanced load, and a five phase fifth harmonic zero sequence filter.

18. The system as set forth in claim 1 wherein third harmonic upstream towards the three phase AC source from the location of the three to five phase power transformer converter are abated.

19. The system as set forth in claim 1 wherein fifth harmonic upstream towards the three phase AC source from the location of the three to five phase power transformer converter are abated.

20. The system as set forth in claim 1 wherein fifth harmonic inside the five phase distribution network upstream towards the five phase AC source from the location of the five phase zero sequence fifth harmonic filter are abated.

21. The system as set forth in claim 1 wherein elimination of the third and fifth harmonic, current total harmonic distortion—THD of the three phase AC power system is abated.

22. The system as set forth in claim 1 wherein elimination of the third and fifth harmonic, voltage total harmonic distortion—THD of the three phase AC power system is abated.

23. The system as set forth in claim 1 wherein elimination of the fifth harmonic, current total harmonic distortion—THD of the five phase distribution network is abated.

24. The system as set forth in claim 1 wherein elimination of the fifth harmonic, voltage total harmonic distortion—THD of the five phase distribution network is abated.

25. The system as set forth in claim 1 wherein elimination of the third and fifth harmonic, abate losses and increase efficiency of the three phase AC power system.

26. The system as set forth in claim 1 wherein elimination of the fifth harmonic, abate losses and increase efficiency of the five phase AC power system.

* * * * *